United States Patent
Umeda et al.

(10) Patent No.: US 7,359,017 B2
(45) Date of Patent: Apr. 15, 2008

(54) OPTICAL COMPENSATION FILM, POLARIZING PLATE, DISPLAYING APPARATUS, METHOD FOR PRODUCING OPTICAL COMPENSATION FILM AND METHOD FOR PRODUCING POLARIZING PLATE

(75) Inventors: Hiroki Umeda, Hino (JP); Katsusuke Nagashima, Kobe (JP); Noriyasu Kuzuhara, Kunitachi (JP); Minori Tamagawa, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 464 days.

(21) Appl. No.: 11/104,092

(22) Filed: Apr. 12, 2005

(65) Prior Publication Data

US 2005/0233095 A1 Oct. 20, 2005

(30) Foreign Application Priority Data

Apr. 19, 2004 (JP) .............................. 2004-122679
Feb. 9, 2005 (JP) .............................. 2005-033303

(51) Int. Cl.
*B29C 55/16* (2006.01)
*B29D 11/00* (2006.01)

(52) U.S. Cl. .................... 349/117; 264/2.7; 264/290.2; 428/1.31

(58) Field of Classification Search ................. 428/1.3, 428/1.31; 349/121, 117; 264/164, 165, 264/210.7, 2.7, 290.2; 536/56, 58, 64, 69
See application file for complete search history.

(56) References Cited

U.S. PATENT DOCUMENTS

| | | | |
|---|---|---|---|
| 2003/0224113 A1* | 12/2003 | Nakamura et al. | 427/372.2 |
| 2004/0155372 A1* | 8/2004 | Allen et al. | 264/2.7 |
| 2004/0241344 A1* | 12/2004 | Kawanishi et al. | 428/1.1 |
| 2007/0031612 A1* | 2/2007 | Shimizu | 428/1.1 |

* cited by examiner

*Primary Examiner*—D. Lawrence Tarazano
*Assistant Examiner*—Jason A Sese
(74) *Attorney, Agent, or Firm*—Lucas & Mercanti, LLP

(57) ABSTRACT

A method for producing a roll of an optical compensation film, in the effective width of which an angle of the slow axis in the film face with the width direction of the film is within the range of ±1° and an angle of the fast axis in the film face with the length direction of the film is within the range of ±1°, wherein the angle of the fast axis in the film face with the length direction is cyclically varied by a cycle of from 1.5 m to 500 m in the length direction of the film and the minimum amplitude of the variation is within the range of from 0.1° to 1°.

30 Claims, 6 Drawing Sheets

LAYER CONSTITUTION OF EXAMPLE

OPTICAL COMPENSATION FILM, POLARIZING PLATE, DISPLAYING APPARATUS, METHOD FOR PRODUCING OPTICAL COMPENSATION FILM AND METHOD FOR PRODUCING POLARIZING PLATE

BACKGROUND OF THE INVENTION

The present invention relates to an optical compensation film, a polarizing plate and a displaying apparatus, more detailed to an optical compensation film which gives light load to the producing equipment and is produced with high yield on the occasion of mass production or continuous production of the film, a polarizing plate with small light leaking and high yield and a displaying apparatus excellent in the contrast unevenness and durability.

TECHNICAL BACKGROUND

A liquid crystal type displaying apparatus is widely applied for the displaying apparatus of word processors and personal computers because it can be operated by low voltage and low electric power consumption and directly connected with IC circuits. The basic structure of the liquid crystal displaying apparatus includes, for example, a liquid crystal cell and polarizing plates arranged on both sides of the liquid crystal cell.

About such the liquid crystal displaying apparatus, though one employing twisted nematic liquid crystal (TN) with a twist angle of 90° and one employing super twisted nematic liquid crystal (STN) with a twist angle of not less than 160° have been developed, a type of liquid crystal different from the TN or STN type has recently been proposed from the viewpoint of the contrast. Namely, a liquid crystal cell so called as a vertical alignment type employing, for example, a negative type liquid crystal having negative dielectric anisotropism has been developed in which the liquid crystal molecules are oriented in vertical to the orientation plate when the voltage is off and in parallel when the voltage is on, contrary to that the liquid crystal molecules are oriented in parallel when the voltage is off and in vertical when the voltage is on in the TN and STN type liquid crystal cells.

Such the vertical alignment type liquid crystal displaying apparatus is disclosed in, for example, Japanese Patent Tokkai Hei 2-176625. The vertical alignment (AV in abbreviated word, hereinafter, referred to as VA sometimes) type liquid crystal displaying apparatus has characteristics such as that black color is definitely displayed, the contrast is high and the viewable angle is wider than that of the TN and STN types since the cell is a vertical orientation mode liquid crystal cell in which the liquid crystal molecules are oriented in vertical to the orientation plate when the voltage is off and in parallel when the voltage is on.

However, a demand for wider viewable angle is raised accompanied with the expanding the liquid crystal image size such as that in a large size TV, and a retarding film is applied for expansion of the viewable angle. Therefore, the width of the optical compensation film tends to be made wider accompanied with the expansion of the displaying size of the liquid crystal displaying image.

Hitherto, though the application of a polymer film is investigated, a usual TAC film shows certain retardation value in the direction of the thickness (Rt) but extremely small retarding value in the film face direction (Ro) and is not always suitable for the purpose of improving the viewable angle of the foregoing VA type LCD.

For solving this problem, a film excellent in the uniformity of the retarding value is known, which is produced by stretching cellulose ester film in the width direction and usable as a polymer film having a slow axis in the film face with the width direction and a polarizing plate protective film.

About the large size optical compensation film, however, it is known that the displacement of the slow axis in the film face causes considerable lowering of the contrast, and a technique relating to the displacement of the slow axis in the film face is disclosed for maintaining the displaying properties (for example, see Tokkai Hei 11-160536 (Patent Document 1), Tokkai 2002-22943 (Patent Document 2).

Usual retarding film is usually laminated with a polarizing plate after production thereof as disclosed in Patent Document 1. In the case of the usual optical compensation film, the light leak from the final polarizing plate (elliptic polarizing plate) with the optical compensation film can be reduced by adjusting the displacement of the axis on the occasion of the laminating with the polarizing plate even when the size of the film is large.

However, a problem is posed that the displacement of the slow axis in the film face of the bulk roll is directly relates to the leak of light after making as the polarizing plate since the optical compensation film to be also used as the polarizing plate protective film is directly laminated roll to roll by PVA and a direct saponification treatment different form the case in which at least one of the polarizing plate and the optical compensation film is cut into chips and the laminated by a adhesive.

A technology relating to the displacement of the slow axis in the film face in the roll to roll lamination is disclosed in Patent Document 2. This technique, however, only refer to inhibition of unevenness of displaying by inhibiting the distribution of the displacement obviously related to the amount of the leaked light. Moreover, it is disclosed that the polymer film having the retardation effect is preferably one having low thermal conductivity, but improvement in the durability of the viewing angle compensation function during the time passing is not referred.

Moreover, a method is disclosed for inhibiting the displacement of the slow axis in the film face in the bulk roll, in which the unevenness of the stretching is solved by softening the film by controlling the temperature on the occasion of stretching (for example, Tokkai 2001-215332 (Patent Document 3)). According to the patent document, the smaller angle among the angle of the direction showing the maximum refractive index with the length direction and that with width direction of the long film (hereinafter referred to as an orientation angle) can be controlled within the range of 3°. However, the film having an orientation angle within such the range is very difficultly employed for a large size displaying apparatus.

Hitherto, there is a concept that the scattering of the orientation angle is inhibited to 0° in the case of that the stretching is applied in the conveying direction of the film. However, it is very difficult to realize such consideration by an apparatus known at present for performing the stretching treatment in the direction different from the conveying direction. Furthermore, it is not realistic to inhibit the scattering of the orientation angle to 0° since a condition having a certain allowance is necessary for raising the yield in the production process in the case of mass production by a continuous production system such as that in the present invention and also from the viewpoint of the stability of the production.

DISCLOSURE OF THE INVENTION

[Problems to be Solved by the Invention]

An object of the invention is to provide an optical compensation film which gives light load to the production equipment on the occasion of the mass production or continuous production, a polarizing plate which is inhibited in the light leaking and able to be produced with high yield and a displaying apparatus excellent in the contrast and the durability.

SUMMARY OF THE INVENTION

The object of the invention can be attained by the following constitution.

(Item 1) A roll of an optical compensation film comprising a film face, wherein, in an effective width of the film, an angle of a slow axis in the film face with a width direction of the film is within the range of from −1° to +1° and an angle of a fast axis in the film face with a length direction of the film is within the range of from −1° to +1°, and wherein the angle of the fast axis in the film face with the length direction has a cyclical variation, the cyclical variation having a cycle of from 1.5 m to 500 m in the length direction of the film and having the minimum amplitude within the range of from 0.1° to 1°.

(Item 2) A roll of an optical compensation film comprising a film face, wherein, in an effective width of the film, an angle of a slow axis in the film face with a width direction of the film is within the range of from 44° to 46° and an angle of a fast axis in the film face with a length direction of the film is within the range of from 44° to 46°, and wherein the angle of the fast axis in the film face with the length direction has a cyclical variation, the cyclical variation having a cycle of from 1.5 m to 500 m in the length direction of the film and having the minimum amplitude within the range of from 0.1° to 1°.

(Item 3) The method for producing a roll of an optical compensation film of anyone of Items 1 and 2, wherein the roll of an optical compensation film is stretched in at least one direction of length and width in a stretching ratio of from 1.05 to 2.

(Item 4) The method for producing a roll of an optical compensation film of anyone of Items 1 through 3 in which the continuous film is conveyed while the both side edges of the film are clipped and applying tension in the width direction and stretched by a stretching apparatus, wherein the stretching is performed by independently controlling the clipping length (the distance from the starting of the clipping and the end of the clipping) of the right and left side edge of the film by the right and left clipping means of the stretching apparatus.

(Item 5) The method for producing a roll of an optical compensation film of anyone of Items 1 through 4, wherein the clipping lengths of the film on the right and left sided are independently controlled by changing at least one of the clip starting position (a clip closer arranged position) or the clip ending position (a clip opener arranged position) on the right side and the left side.

(Item 6) The method for producing a roll of an optical compensation film of anyone of Items 1 through 5, wherein the clipping lengths of the film on the right and left sided are independently controlled by independently changing the lengths of the caterpillar rails for moving connected clipping means applying tension in the width direction by clipping the right and left edges of the continuous film.

(Item 7) The method for producing a roll of an optical compensation film of anyone of Items 1 through 6, wherein the speeds of right side and left side clipping means are independently controlled in the stretching apparatus.

(Item 8) The method for producing a roll of an optical compensation film of anyone of Items 1 through 7, wherein the orientation angle of the film is measured online before the windup of the film, and at least one of the method of independently controlling the right and left clipping lengths by the light and left clipping means of the stretching apparatus and the method of independently controlling the speeds of the right and left clipping means of the stretching apparatus is applied for film producing according to the measurement result.

(Item 9) The method for producing a roll of an optical compensation film of anyone of Items 1 through 8, wherein the positions of the right and left clipping means at the clipping starting portion and the clipping ending portion are measured online to determine the retardation of the film occurring at the clipping position, and at least one of the method of independently controlling the right and left clipping lengths by the right and left clipping means of the stretching apparatus and the method of independently controlling the speeds of the right and left clipping means of the stretching apparatus is applied for film producing according to the measurement result.

(Item 10) An optical compensation film obtained by cutting the roll of the optical compensation film of anyone of Items 1 through 9.

(Item 11) The optical compensation film of Item 11, wherein the retardation (Ro) of the face expressed by the following Expression 1 is from 25 to 300 nm;

$$Ro = (nx - ny) \times d \qquad \text{Expression 1}$$

in the expression, nx is the refractive index in the direction in which the refraction index of the face becomes largest and ny is the refractive index in the direction making a right angle with the direction of nx and d is a thickness (nm) of the film.

(Item 12) The optical compensation film of Items 11, wherein the retardation (Rt) in the direction of the thickness expressed by the following Expression 2 is from −100 to 400 nm $$Rt = ((nx + ny)/2 - nz) \times d \qquad \text{Expression 2}$$

in the expression, nx is the refractive index in the direction in which the refraction index of the face becomes largest, ny is the refractive index in the direction making a right angle with the direction of nx, nz is the refractive index in the direction of the thickness and d is a thickness (nm) of the film.

(Item 13) A roll of a polarizing plate having the optical compensation film of item 12.

(Item 14) The method for producing a roll of a polarizing plate produced by a roll to roll laminating method with the roll of an optical compensation film of item 13 and with a roll of a polarizing film (Item 15) A polarizing plate obtained by cutting the roll of the polarizing plate of Items 13.

(Item 16) A displaying apparatus having the optical compensation film described in Items 11 through 13.

The effective width of the film is the width of the film practically usable in the entire width of the film. For example, in the case of the polarizing plate protective film, the edge portion of the film is subjected sometimes to a knurling treatment. This portion is cut off on the occasion of laminating with the panel and is not employed. In such the case, the effective width of the film is the width of the portion remaining after exception of the knurling portion.

An optical compensation film which gives light load to the production equipment on the occasion of the mass production or continuous production, a polarizing plate which is inhibited in the light leaking and able to be produced with high yield and a displaying apparatus excellent in the contrast and the durability can be provided by the invention.

DETAILED DESCRIPTION OF THE PREFERRED EMBODIMENT

The best embodiment of the invention is described below, but the invention is not limited thereto.

Figure 10:
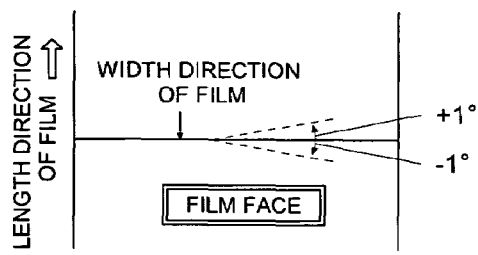
FIG. 10 shows the angle of the slow axis in the film face with the width direction of the film in the effective width of the film roll.
Figure 12:
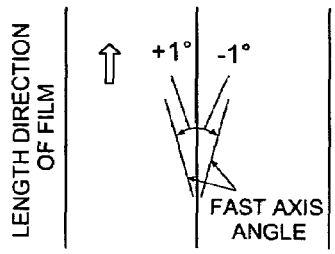
FIG. 12 shows the angle of the fast axis in the film face with the length direction of the film.

The invention is a method for producing a roll of an optical compensation film, in the effective width of which an angle of the slow axis in the film face with the width direction of the film is within the range of ±1° and an angle of the fast axis in the film face with the length direction of the film is within the range of ±1°, wherein the angel of the fast axis in the film face with the length direction is cyclically varied by a cycle of from 1.5 m to 500 m in the length direction of the film and the minimum amplitude of the variation is within the range of from 0.1° to 1°. An example of the angle of the slow axis in the film face with the effective width of the roll shaped film with the width direction of the film and that of the angle of the fast axis in the film face with the length direction of the film are each shown in FIGS. 10 and 12, respectively.

It is found as a result of investigation by the inventors that the unevenness of the luminance and the color within the practical displaying area is substantially not influenced when the angle of the fast axis of the film with the length direction of the film is varied within in a certain range with a long cycle (in concrete, a varying cycle satisfactorily longer than the longer side of the liquid crystal displaying apparatus). It is found that the influence on the polarizing plate and the displaying apparatus can be minimized compared with a long film having a deviation of the axis variation but has no cyclic variation, and the production efficiency of the film can be raised while reducing the load on the producing condition by such the film. In the invention, the improvement in the yield includes raising of the yield in the production process of the long optical compensation film, to inhibit the lowering of the yield caused by light leaking of the polarizing plate employing the optical compensation film and to prevent the lowering of the yield caused by the light leaking when the polarizing plate is made up a liquid crystal displaying apparatus.

The direction of the slow axis in the film face is the direction in which the refractive index in the film face becomes maximum and the angle of the slow axis in the film face with the width direction of the film is the angle of the slow axis with a standard line when the width direction of the film is defined as the standard line (0°). When the roll shaped film is stretched in the width direction, the direction making a right angle with the conveying direction is defined as the standard line.

The direction of the fast axis in the film face is the direction making a right angle with the slow axis in the film face, and the angle of the fast axis in the film face with the length is the direction making a right angle with the width direction of the film when the roll-shaped film is stretched in the width direction, namely the angle of the fast axis with the standard line (0°).which is defined by the length direction.

The invention is the method for producing a roll of an optical compensation film, in the effective width of which an angle of the slow axis in the film face with the width direction of the film is within the range of ±1° and an angle of the fast axis in the film face with the length direction of the film is within the range of ±1°, wherein the angel of the fast axis in the film face with the length direction is cyclically varied by a cycle of from 1.5 m to 500 m in the length direction of the film and the minimum amplitude of the variation is within the range of from 0.1° to 1°. It is found that the foregoing problems can be solved by the above-described film. Namely, it is found that the foregoing problems can be solved with reduced load to the producing condition and improved producing efficiency by the optical compensation film in which the scattering of orientation angle is periodically varied within a certain range rather than a film in which it is tried that the scattering of the orientation angle is inhibited to 0°.

Particularly, the uniformity in the width direction is extremely important factor since it is necessary to constantly hold the angle of the slow axis adjusting to the width of the polarizing plate when the optical compensation film is laminated roll to roll with the polarizing film. However, any film uniform in the entire width and length directions which satisfies the above conditions has not been disclosed at all.

An elliptic polarizing plate can be obtained, which is extremely stable to the environmental variation without degradation in the displaying properties caused by the variation in the slow axis angle even when the plate is subjected to durability tests under a high temperature dried condition and a high temperature high humidity condition, by exactly maintaining the variation range of the slow axis and the fast axis in the width direction and the length direction of the raw roll of the optical compensation film.

Moreover, it is found that the foregoing problems can be also solved on the occasion of producing a λ/4 unitized polarizing plate by slantwise 45° stretching, which is useful for a reflection type displaying apparatus, by an optical compensation film in the effective width of which an angle of the slow axis in the film face with the width direction of the film is within the range of 45±1° and an angle of the fast axis in the film face with the length direction of the film is within the range of 45±1°, and the angel of the fast axis in the film face with the length direction is cyclically varied by a cycle of from 1.5 m to 500 m in the length direction of the film and the minimum amplitude of the variation is within the range of from 0.1° to 1°.

The invention is described in detail below.

(Film)

The film to be employed for the optical compensation film according to the invention is preferably one optically uniform and transparent. Any materials are employable as long as they have such the properties, for example, a cellulose ester type film, a polyester type film, a polycarbonate type film, a polyallylate type film, a polysulfone (including a polyether sulfone) type film, a film of a polyester such as poly(ethylene terephthalate) and poly(ethylene naphthalate), a polyethylene film, polypropylene film, cellophane, a cellulose diacetate film, a cellulose acetate butylate film, a poly(vinylidene chloride) film, a poly(vinyl alcohol) film, an ethylene vinyl alcohol film, a cyndiotactic polystyrene type film, a polycarbonate film, a norbornene resin type film, a polymethylpentene film, a poly(ether ketone) film, a polyamide film, a fluororesin film, a nylon film, a cycloolefin polymer film, a poly(methyl methacrylate) film and an acryl film are employable, but the film is not limited to the above. Films produced by a solution casting method or a melting method are preferably employed. Among them, the cellulose ester film, polycarbonate film, polysulfone (including polyethersulfone) film, and cycloolefin polymer film are preferable, and the cellulose ester film and the cycloolefin polymer film are preferable from the viewpoints of the production, cost, transparency, uniformity and adhesive ability.

First, the cellulose ester film preferably employable in the invention is described below.

[Preparation of Cellulose Ester Film]

The preparation method of the cellulose ester film is described below (a solution casting film making method is described as a typical example).

<Dissolving Process>

In this process, cellulose ester is dissolved by while stirring in an organic solvent principally constituted by a solvent suitable for the cellulose ester to prepare a dope. The dissolving method include various methods such as a method in which the dissolution is carried out at a temperature lower than the boiling point of the principal solvent under an ordinary pressure, a method in which the dissolution is carried out at a temperature higher than the boiling point of the principal solvent under a high pressure and a method in which the dissolution is carried out while cooling by a temperature less than 0° C. or under a high pressure. Though these methods are each suitably applied in the invention, a high temperature method in which the dissolution is performed at a temperature higher than the boiling point of the principal solvent under the high pressure is preferably applied. After the dissolution, the dope is filtered by a filter and defoamed and then moved to the next process by a pump.

Additives having various functions such as a plasticizer, an antioxidant, a UV absorbent, a matting agent and a retardation controlling agent can be added to the dope. Such the additives may be added together with the cellulose ester and the solvent on the occasion of the dope preparation, in the course of or after the preparation of the dope. Moreover, a thermal stabilizer such as an alkali-earth metal salt, an antistatic agent, a flame retardant, a lubricant and oil are added sometimes.

<Casting Process>

In the casting process, the dope is moved to a high pressure die through a pressure metering gear pump and cast through the pressure die at the casting position onto an endlessly circulating endless metal belt or a rotating metal drum each having a mirror surface (hereinafter referred to as a metal support). The die of the casting equipment is preferably a pressure die in which the form of slit can be controlled so that the thickness of the web can be easily made to uniform. The pressure die includes a coat hunger die and a T die, and both of them are preferably employed. It is allowed for increasing the casting speed that the two or more pressure dies are arranged on the metal support and the dope is divided for double layer casting.

In the invention, a wide cellulose ester film is employed. One having a width of from 1.3 to 4 m, and particularly from 1.4 to 2 m, is preferable. When the width is over 4 m, the transportation of the film roll becomes difficult. The thickness of the cellulose ester film is from 10 to 200 μm, preferably from 10 to 150 μm, and more preferably from 40 to 100 μm, in the finished thickness of the film for reducing the thickness of the liquid crystal displaying apparatus. When the thickness is too small, for example, the strength necessary for the polarizing plate protective layer can not be obtained sometimes. When the thickness is excessively large, the superiority in the thin layer to the usual cellulose ester film is lost.

The thickness is preferably controlled by controlling the concentration of the dope, the transportation speed of the pump, the space of the slit, the extrusion pressure of the die and the speed of the metal support so as to make the thickness to the designated value. Moreover, it is preferable for making uniform film thickness to control the thickness by feedbacking information obtained by a thickness detecting means according a program.

<Solvent Evaporation Process>

In the process, the web is heated on the metal support to evaporate the organic solvent. The method for evaporation the organic solvent includes a method in which air is blown from the web side and/or a method in which heat is conducted by a liquid from the back side of the metal support, and a method in which the web is heated from the face and back sides by heat radiation, these methods are preferably applied in the invention.

<Peeling Process>

In the process, the web is peeled off from the metal support after the evaporation of the organic solvent. The peeled web is transported to the next drying process. When the remaining amount of the organic solvent is excessively large at the time of peeling, the peeling is made difficult, and when the peeling is performed after that the web is sufficiently dried on the metal support, a part of the web is peeled off sometimes on the half way.

A gel casting method is applied for further raising the casting speed, by which the web can be peeled off even when the amount of the remaining solvent is large. The gel casting method include a method in which a poor solvent for the cellulose ester is added to the dope so that the dope gels after the casting and a method in which the dope gels by lowering the temperature of the metal support. When the dope gels on the metal support, the strength of the film is high and the layer can be peeled off even when the remaining amount of the solvent is large. When the peeling is performed at a time when the reaming amount of the solvent is large, occurrence of deformation and lengthwise lines tend to be caused by the peeling force. Accordingly, the amount of remaining solvent is decided considering the balance of the economical producing speed and the quality of the product. In the invention, the peeling is preferably performed at a remaining solvent content of from 10 to 120% by weight.

It is preferable to control the temperature at the peeling position on the metal support to from 10 to 40%, more preferably from 15 to 30% by weight. The remaining solvent amount in the web at the peeling position is preferably made to from 30 to 120% by weight. In the invention, the remaining solvent amount can be expressed by the later-mentioned expression.

When the casting is carried out on the belt-shaped support, increasing in the casting speed accelerates the vibration of the belt. The casting speed is preferably from 10 to 120 m/minute, and more preferably from 15 to 100 m/minute, considering the remaining solvent amount and the length of the belt.

In the invention, the remaining solvent amount of the entire width of the web is sometimes referred to as an average remaining solvent amount or a remaining solvent amount at the central portion, and a local amount of the remaining solvent such as that at the both edge portions of the web is cited in some cases.

<Drying Process>

In the process, the web is dried by drying apparatus in which the web is conveyed by alternately passing the web through staggeringly arranged guide rollers and/or a tenter drying apparatus in which the web is conveyed while clipping the both edge of the web by clips. The drying is generally performed by blowing hot air to the both surfaced of the web, and a method by heating by microwaves in the place of the air blowing is applicable. Excessively rapid drying tends to cause degradation in the flatness of the finished film. The drying temperature through the entire process is preferably from 40 to 250° C., and more preferably from 70 to 180° C. The drying temperature, the drying air amount and the drying time are varied depending on the kinds of used organic solvent, and the drying conditions may be optionally selected in accordance with the kind and the combination of the solvent to be employed.

In the drying process after the peeling from the metal support surface, the web is shrunk in the both directions accompanied with the evaporation of the solvent. The shrinking is made larger when the drying is performed faster at high temperature. It is preferable for improving the flatness of the finished film to dry the web while inhibiting the shrink as small as possible. From such the viewpoint, a method (an inline tenter method) is preferable, in which the web is clipped in the width direction at the both edged of the web and dried while maintaining the width of the web in the entire of apart of the drying process as disclosed in, for example, Japanese Patent Tokkai Sho 62-46625. The retardation suitable for the invention can be obtained by controlling the stretching ratio of the web, the amount of the remaining solvent and the temperature in this process.

In the invention, for example, the retardation suitable for viewable angle compensation can be given by stretching with a stretching ratio of from 1.05 to 2, preferably from 1.05 to 1.5, and further preferably from 1.15 to 1.45 at a remaining solvent amount in the film of from 5 to 30% by weight and a stretching temperature of the film of from 60 to 160° C. In such the case, the width direction (TD direction) is nx direction in which the refractive index is largest or the slow axis direction in the film face, the length direction (MD direction) is ny direction and the thickness direction is the nz direction. The retardation is determined by the average value of refractive index of the sample measured by an Abbe's refractometer. Moreover, three-dimensional refractive index measurement is carried out by a double refractometer KOBRA-21ADH, manufactured by Oji Keisokukiki Co., Ltd., under conditions of 23° C. and 55% RH at a wavelength of 590 nm. The refractive indexes nx, ny and nz are calculated by thus obtained measurement results of the retardation and the average refractive index.

The retardation value can be obtained by substituting thus obtained value in the following expression.

$$Ro = (nx-ny) \times d \qquad \text{Expression 1}$$

$$Rt = \{(nx+ny)/2 - nz\} \times d \qquad \text{Expression 2}$$

In the above expressions, nx is the refractive index in the direction of the slow axis in the film face, ny is the refractive index in the direction of the fast axis in the film face, nz is the refractive index in the direction of the thickness of the film and d is the thickness of the film.

In the invention, the retardation in the film face (Ro) represented by Expression 1 is preferably from 25 to 300 nm, and the retardation in the thickness direction (Rt) represented by Expression 2 is preferably from −100 to 400 nm for obtaining the superior effects of the invention.

The stretching operation may be divided into plural steps and a two-dimensional stretch may be applied in the casting direction and the width direction. The two-dimensional stretching either may be performed simultaneously or step-wise in two-dimensional. In such the case of the stepwise stretching, for example, it is allowed that the stretching in the different directions are successively carried out or the stretching in the same direction is separately performed in plural steps and stretching in another direction may be inserted between any of the plural steps. For example, the following stretching steps can be applied.

Stretching in the casting direction—stretching in the width direction—stretching in the casting direction—stretching in the casting direction Stretching in the width direction—stretching in the width direction—stretching in the casting direction—stretching in the casting direction In the tenter process, the distribution of the atmosphere temperature of the film is preferably small within a preferable range for raising the uniformity of the film. The distribution of the temperature in the tenter process is preferably within ±5° C., more preferably ±2° C., and most preferably ±1° C. It can be expected that the temperature distribution in the width direction of the film is reduced by reducing the above temperature distribution.

In the tenter process, the heat transfer coefficient either may be constant or varied. The heat transfer coefficient is preferably within the range of from 41.9 to 419×10$^3$ J/m$^2$hr. The range is more preferably from 41.9 to 209.5×10$^3$ J/m$^2$hr and most preferably from 41.9×10$^3$ J/m$^2$hr.

The optical compensation film of the invention is characterized in that, in the width direction in the effective width of the film and the length direction, an angle of the slow axis in the film face with the width direction of the film is within the range of ±1°, and an angle of the fast axis in the film face with the length direction of the film is within the range of ±1°, wherein the angel of the fast axis in the film face with the length direction is cyclically varied by a cycle of from 1.5 m to 500 m in the length direction of the film within the range of ±1° and the minimum amplitude of the variation is not less than 0.1°.

Figure 13:
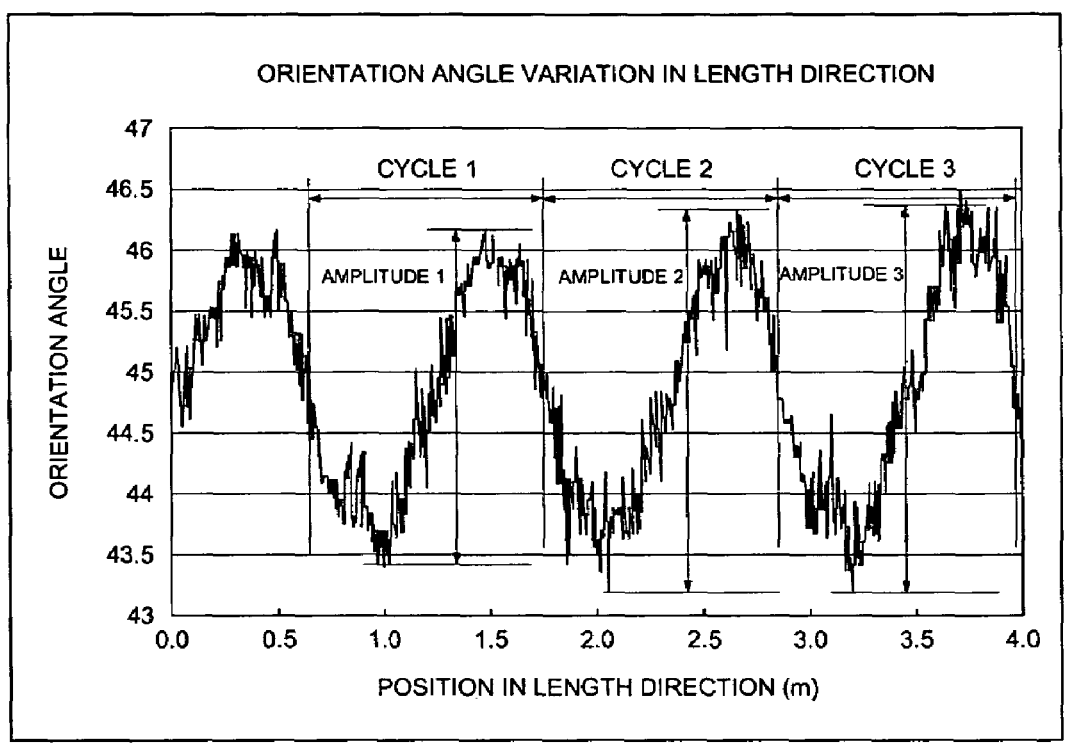
FIG. 13 shows the description of the minimum amplitude of the cycle.

The minimum amplitude of the variation cycle is described below referring FIG. 13. The minimum amplitude of the variation cycle is the smallest amplitude angle (the half value of the smallest angle among the angles of Amplitudes 1 through 3 in FIG. 13) among the amplitude of the variation cycle of fast axis angles (the half value of the angles of Amplitude 1 of Cycle 1, Amplitude 2 of Cycle 2 and Amplitude 3 of Cycle 3 in FIG. 13) when the length direction is defined as the standard line (0°). In the case of the 45°, the standard line is the direction of 45°.

It is advantageous in the properties and the production of the film that the angle of the slow angle in the film face with width direction of the film is preferably not more than 0.7°, and more preferably not more than 0.5°, and varied by a cycle of from 1.5 m to 500 m in the length direction of which the minimum amplitude of the cycle is preferably within the range of from 0.1° to 1.0°, and more preferably from 0.3° to 0.7°. Particularly, it is preferable that the angle of the fast axis in the film face with the length direction and the minimum amplitude of the variation cycle thereof are within the above range in a length of 10 m of the film.

The orientation angle in the length direction can be measured, for example, by inserting KOBRA 311, manufactured by Ooji Keisokukiki Co., Ltd., in the casting line. When the variation amplitude becomes large, it is easily controlled by varying the balance of the temperature and the air amount in front, behind, right and left of the tenter, the conveying tension and formation of a slack at the entrance and exit portion of the tenter.

For fixing the orientation angle at 0°, feedbacking is necessary so as to vary the temperature at the front and the behind of the stretching portion of the tenter by ten and several degrees within one second when a deposition of 0.04° is detected. In such the case, though depending on the thermal capacity, the variation of the temperature from 100° C. to 114° C. within 1 second can be attained by feedbacking for making the temperature of air introduced in the tenter portion of not less that 125° C. and increasing the amount of the air by 5 times of usual air amount. It is confirmed, however, that the practical yield is considerably lowered since the film is exposed to air having excessive high temperature for rising the atmosphere temperature and the film having the necessary retardation and the orientation angle can not be obtained as a result of that. When 0.1° is approximately attained in the production of 10,000 m of film, large variation in the value of R or shift in the orientation angle of not less than 1° occur on the timing of the feedback. The distance of the clips of approximately from 1 mm to 100 mm should be also controlled within one second, such the controlling sometimes reckless run when the timing of the feedbacking is not controlled even though no problem is posed sometimes.

It is preferable for producing the □/4 plate unitized polarizing plate by 45° stretching that an angle of the slow axis in the film face with the width direction of the film is within the range of 45±1° in the width direction in the effective width of the film and the length direction, and an angle of the fast axis in the film face with the length direction of the film is within the range of 45±1°, wherein the angel of the fast axis in the film face with the length direction is cyclically varied with a cycle of from 1.5 m to 500 m in the length direction of the film within the range of ±1° and the minimum amplitude of the variation is not less than 0.1°. It is more preferable that the angle of the slow axis in the film face with the length direction of the film is within the range of 45±0.7°, particularly 45±0.5°. The angle of the slow axis in the film face with the length direction is further preferable within the range of 45±0.7° and the angle is varied with a cycle of from 1.5 m to 500 m and the minimum amplitude of the cycle is preferably within the range of from 0.1° to 1°, particularly from 0.3° to 0.7°.

The optical compensation film according to the invention having the above-described properties is described in detail referring drawings. The drawing is an example and the invention is not limited by the drawings.

Figure 1:
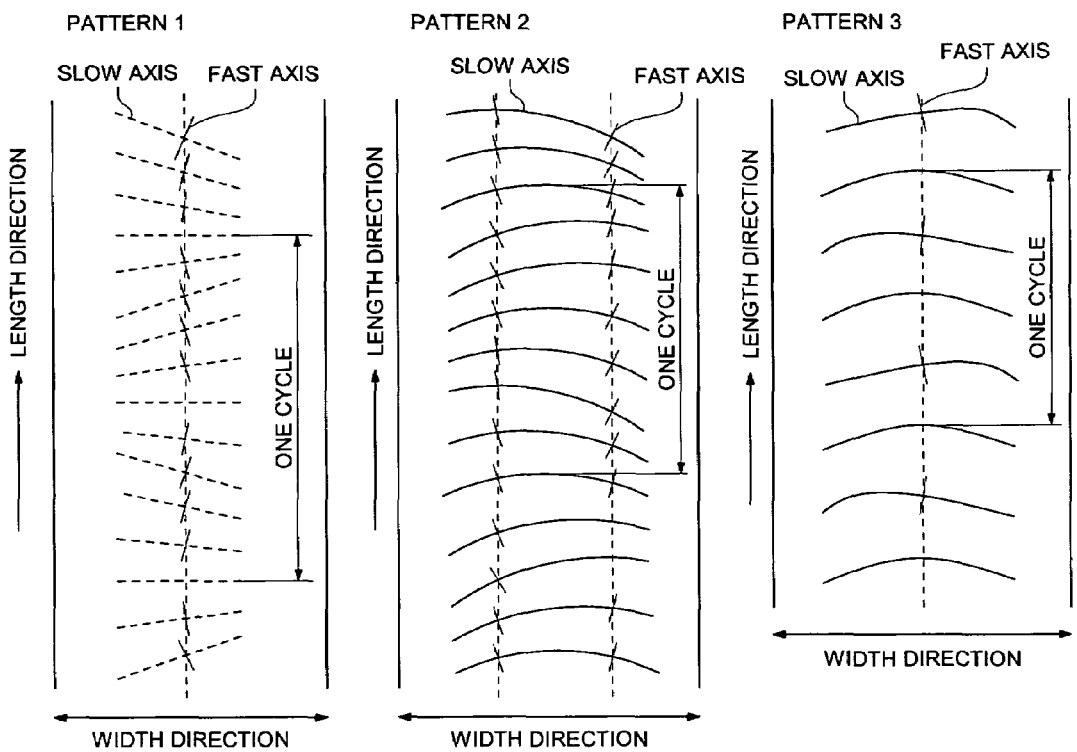
FIG. 1 shows a schematic drawing of the distribution of the orientation angle and the cycle of the orientation angle.

FIG. 1 schematically displays the distribution of the slow axis and the fast axis relating to the invention.

Pattern 1 shows a schematic drawing in which the angles of the slow axis in the film face with the width direction of the film are distributed within the range of ±1°, and the angle of the fast axis, making a right angle with the slow axis, with the length direction of the film is cyclically varied within the range of ±1° and the minimum amplitude of the cycle is not less than 0.1°. The cycle of the angle of the fast axis in the film face with the length direction is not less than 1.5 m without any specific upper limit. However, in the practical production conditions, one or more cycles are preferably in a bulk roll of from 2,500 m to 5,000 m. In the case of the oblique stretching related to Item 2, the same cycles are preferred.

An example of the method for inhibiting the scattering width of the orientation angle is cited below but the method is not limited to the followings.

The scattering range of the orientation angle can be controlled in the processes from the metal support for casting to the tenter portion by changing the conveying tension, difference of the temperature and the air amount at the right and left sides on the occasion of the drying, or changing of the position of blowing nozzles. Furthermore, the scattering range can also be controlled at the tenter portion by changing the tension, position of the clips, distance of the clips and clipping force.

As a result of the investigation on the foregoing object by the inventors, it is found that the production efficiency can coincides with the yield when the film is applied for the polarizing plate and the displaying apparatus without extremely delicate adjusting on the production equipment and the production conditions when the angle of the fast axis in the film face with the length direction is varied with the cycle. Thus the invention has been attained.

Patterns 2 and 3 each show a case in which the direction of the slow axes are not constant in the width direction of the film. In such the case, the cyclical variation of the angel of the fast axis in the film face with the length direction of the film is necessary.

In the invention, the stretching in the width direction is a stretching form in which the dimension of the film is lengthened after the continuous stretching treatment including the stress in complicated directions since the film is stretched in the width direction while the film is conveyed. The stretching with the dimensional variation in the conveying direction and that without dimensional variation of the conveying direction are included in the above case.

In some cases, a distribution of the orientation angle in the width direction occurs when the film is stretched in the width direction. Namely, the direction of the slow axis is separated sometimes from the stretching direction. Such the phenomenon sometimes occurs when the tenter method is applied, which is caused by generation of shrinking force at the central portion of the film by the stretching in the width direction while fixing at the edge portion, the phenomenon is called as bowing phenomenon. The bowing phenomenon can be inhibited by lengthening or shrinking film in the casting direction and controlling the stretching conditions such as the temperature at the front or behind of the tenter, remaining amount of the solvent and tension of the clips so that the distribution of the retardation in the width direction can be reduced for improvement.

At the time of completion of the tenter process, the distortion remaining in the TD direction is larger than that in the MD direction. In the invention, therefore, the film is dried by conveying by rollers after the completion of the stretching in the width direction by the tenter while alleviating the distortion in the TD direction under the conditions of a remaining solvent amount of from 5 to 30% by weight, a temperature of from 40 to 150° C. and a tension of from 30 to 300 N/m. Thus the optical compensation film in which the angle of the slow axis in the film face to the stretching direction of the entire width of the film is within ±1° can be produced. In such the case, the alleviation in the TD direction is important condition, and the foregoing variation range of the slow axis as the essential matters of the invention can be attained, for example, by repeatedly conveying the film by 400 or more rolls under the foregoing temperature and the tension.

<Winding up Process>

In the process, the dried web is wound up as film. The film having high dimensional stability can be obtained by making the remaining amount of the solvent at the time of the completion of the drying to not more than 2% by weight, preferably not more than 1%, and particularly not more than 0.4% by weight. Usual winders can be employed for the winding. For controlling the winding tension, a constant torque method, a constant tension method, a super tension method and a programmed tension controlling method for constantly holding the inner stress are applicable, and these methods may be optionally applied.

The remaining solvent amount can be represented by the following expression.

Remaining solvent amount (weight-%)={$(M-N)/N$}×100

In the above, M is the weight of a web at an optional moment and N is the weight of the web after drying for 3 hours at 110° C.

In the process of the solution casting film producing method through the just after the casting to the drying, though air is suitable for the atmosphere in the drying equipment, the process may be performed in a inactive gas such as nitrogen gas and carbon dioxide gas. Of course, the dangerousness of explosion limit of the evaporated solvent in the atmosphere should be considered always.

<Cellulose Ester Film and its Composition>

Cellulose for the cellulose ester to be used in the invention is not specifically limited and cotton linter, wood pulp and kenaf are employable. Cellulose esters produced from these raw materials may be mixed in an optional ratio.

The number average molecular weight (Mn) is preferably from 80,000 to 2,000,000, more preferably from 100,000 to 200,000, particularly preferable from 150,000 to 200,000.

The ratio Mw/Mn of the weight average molecular weight (Mw) to the number average molecular weight (Mn) of the cellulose ester to be employed in the invention is preferably from 1.4 to 3.0, and more preferably from 1.7 to 2.2. The use of the cellulose having the ratio within the above range is preferable for enhancing the effects of the invention.

The average molecular weight and the distribution of the molecular weight can be measured by a known method employing a high speed liquid chromatography. The number average molecular weight and the weight average molecular weight can be determined by employing the measured results and their ratio Mw/Mn can be calculated.

The measuring conditions are as follows:
Solvent: Methylene chloride
Column: Three columns of Shodex K806, K805 and K803G (manufactured by Showa Denko Co., Ltd.)
Column temperature: 25° C.
Sample concentration: 0.1% by weight
Detector: RI Model 504 (manufactured by Science Co., Ltd.)
Pump: L6000 (manufactured by Hitachi Seisakusho Co., Ltd.)
Flowing amount: 1.0 ml/minute
Calibration curve: A calibration curve prepared by using 13 samples of Mw of from 1,000,000 to 500 of Standard polystyrene STK standard polystyrene (manufactured by Toso Co., Ltd.). The 13 samples each having almost equal interval is preferably employed.

The cellulose ester to be employed in the invention is obtained by acylation of the raw cellulose. When the acylating agent is an acid anhydride such as acetic acid anhydride, propionic acid anhydride and lactic acid anhydride, the reaction is performed by using an organic acid such as acetic acid or an organic solvent such as methylene chloride as the solvent and a proton type catalyst such as sulfuric acid as the catalyst. When the acylating agent is an acid chloride such as $CH_3COCl$, $C_2H_5COCL$ and $C_3H_7COCl$, the reaction is performed by using a basic compound such as an amine as the catalyst. In concrete, the synthesis can be carried out by the method described in Japanese Patent Tokkai Hei 10-45804.

The cellulose ester to be employed in the invention is a carboxylic acid ester having about 2 to 22 carbon atoms, and a lower fatty acid ester of cellulose is particularly preferred. The lower fatty acid in the lower fatty acid ester of cellulose is a fatty acid having 6 or less carbon atoms, for example, cellulose acetate, cellulose propionate, cellulose butylate, cellulose acetate-phthalate and admixed fatty acid ester such as cellulose acetate-propionate described in Japanese Patent Tokkai-Hei 10-45804 and 8-231761 and U.S. Pat. No. 2,319,052, and cellulose acetate-butylate are employable. A cellulose ester of an aromatic carboxylic acid and cellulose acrylate described in Japanese Patent Tokkai 2002-179701, 2002-265639 and 2002-265638 are also preferably usable. In the above-mentioned, particularly preferable lower fatty acid ester of cellulose is triacetate and cellulose acetate-propionate. These cellulose esters may be employed in a state of mixture.

The cellulose ester is formed by reaction of an acyl group with a hydroxyl group of a cellulose molecule. The cellulose molecule is constituted many glucose units linked with together, and the glucose unit has three hydroxyl groups. The number of the acyl group introduced to the hydroxyl groups is referred to as a substitution degree.

A cellulose ester having a total acyl group substitution degree of from 2.3 to 2.85 is employed in the invention.

A preferable cellulose ester other than the cellulose triacetate is one having an acyl group having 2 to 4 carbon atoms as the substituent and satisfying the following expressions in the same time, in which X is the substitution degree of acetyl group and Y is that of propionyl group.

$$2.3 \leq X+Y \leq 2.85 \quad \text{(I)}$$

$$1.4 \leq X \leq 2.85 \quad \text{(II)}$$

In the above, X is substitution degree of acetyl group and Y is substitution degree of propionyl group and/or butyryl group.

Among them, a cellulose acetate-butyrate satisfying $1.9 \leq X \leq 2.5$, and $0.1 \leq Y \leq 0.9$ (the total acyl group substitution degree=X+Y) is preferred. The part not substituted by the acyl group usually remains as a hydroxyl group. These compounds can be synthesized by known methods.

The acyl group substitution degree can be measured according to the method defined in ASTM-D817-96.

The substitution degree and the substituting group of employed cellulose ester are important factors for controlling the retardation and the slow axis property of the cellulose ester film. In the invention, the cellulose ester satisfying the foregoing expressions is preferable since the retardation suitable for the viewable angle compensation polarizing plate can be easily obtained by such the cellulose ester.

In the invention, it is preferable that the cellulose ester film contains the later-mentioned compound having at least two aromatic rings in an amount of from 0.01 to 20 parts by weight to 100 parts by weight of the cellulose ester film, by which the retardation suitable for the viewable angle compensation polarizing plate can be easily obtained.

[Additive for Cellulose Ester Film]

In the invention, a compound having at least two aromatic rings is preferably employed. A compound having at least two aromatic rings and the at least two aromatic rings have planar structure is more preferable. The cellulose ester film containing such the compound can be produced by adding such the compound to the dope together with the cellulose ester and the organic solvent and making the film by the solution casting method.

The compound relating to the invention which has at least two aromatic rings having the planar structure may be a compound in which the two aromatic rings are approximately on the same plane. Namely, the compound preferably has from 5 to 10 π-electrons contained in the two aromatic rings, an aromatic heterocyclic ring and an aromatic ring having a linking group bonding these rings. The number of the rings contained in the compound is preferably from 2 to 20, more preferably from 2 to 12, and further preferably from 2 to 8. The aromatic ring includes an aromatic hydrocarbon ring and an aromatic heterocyclic ring. A 6-member ring or a benzene ring is particularly preferable as the aromatic ring. The aromatic heterocyclic ring is usually an unsaturated ring. As the heterocyclic ring, a 5-member, 6-member and 7-member rings are preferable and the 5-member and 6-member rings are particularly preferable. The aromatic heterocyclic ring usually has largest number of double bond. As the hetero atom, a nitrogen atom, an oxygen atom and a sulfur atom are preferable and the nitrogen atom is particularly preferred.

Examples of the aromatic heterocyclic ring include a furan ring, a thiophene ring, a pyrrole ring, an oxazole ring, an iso-oxazole ring, a thiazole ring, an iso-thiazole ring, an imidazole ring, a pyrazole ring, a furazane ring, a triazole ring, a pyran ring, a pyridine ring, a pyridazine ring, a pyrimidine ring, a pyrazine ring and a 1,3,5-triazine ring. As the aromatic ring, the benzene ring, furan ring, thiophene ring, pyrrole ring, oxazole ring, thiazole ring, imidazole ring, triazole ring, pyridine ring, pyrimidine ring, pyrazine ring and 1,3,5-triazine ring are preferred.

The bonding relation of the two aromatic rings can be classified into (a) a case of forming a condensed ring, (b) a case of bonding with a single bond, (c) a case of bonding through a liking group and (d) a case of bonding through a linking group having the π-electron (a spiro bond cannot be formed since the ring is aromatic ring). Provided that, in the cases (b) and (c), it is necessary that the two aromatic rings have planar structure.

Examples of the condensation ring of (a) (condensation ring of two or more aromatic rings) include an indene ring, a naphthalene ring, an azulene ring, a fluorene ring, phenanthrene ring, an anthracene ring, an acenaphthylene ring, a biphenylene ring, a naphthacene ring, a pyrene ring, an indole ring, an iso-indole ring, a benzofuran ring, a benzothiophen ring, an indolidine ring, a benzoxazole ring, a benzothiazole ring, a benzimidazole ring, a benzotriazole ring, a purine ring, an indazole ring, a cumerone ring, a quinoline ring, an iso-quinoline ring, a quinolidine ring, a quinazoline ring, a cinnoline ring, a quinoxsaline ring, a phthaladine ring, a pteridine ring, a carbazole ring, an acridine ring, a phenanthlidine ring, a xanthene ring, a phenadine ring, a phenothiazine ring, a phenoxatine ring, a phenoxadine ring and a thianthlene ring. The naphthalene ring, azulene ring, benzoxazole ring, benzothiazole ring, bezimidazole ring, benzotriazole ring and quinoline ring are preferred.

The single bond of (b) is preferable a bond between carbon atoms. An aliphatic ring or a non-aromatic heterocyclic ring may be formed by bonding two aromatic rings by two or more single bonds.

It is preferable that the linking bond having the π-electron of (c) or (d) bonds the carbon atoms of the two aromatic rings. The linking group is preferably an alkylene group, an alkenylene group, an alkynylene group, a —CO— group, an —O— atom, a —NH— group, an —S— atom or a combination thereof. The examples of the kinking group composed of the combination are listed below. In the following examples, the right and left of the group may be reversed. For example, —CO—O—, —CO—NH—, -alkylene-O—, —NH—CO—NH—, —NH—CO—O—, —O—CO—O—, —O-alkylene-O—, —CO-alkenylene-, —CO-alkenylene-NH—, —CO-alkenylene-O—, -alkylene-CO—O-alkylene-O—CO-alkylene-, —O-alkylene-CO—O-alkylene-CO—O-alkylene-O—, —O—CO-alkylene-CO—O—, —NH—CO-alkenylene- and —O—CO-alkenylene are cited, and —CO— and alkenylene are particularly preferable for directly bonding the aromatic ring or the heterocyclic ring.

The aromatic ring and the linking group may have a substituent. Provided that it is necessary that the substituent has a structure not causing steric hindrance between the two aromatic rings, namely a planar structure. In the steric hindrance, the kind and the position of the substituent are important. Regarding the kind of the substituent, a spatially bulky group such as a tertiary alkyl group is easily causes steric hindrance, and regarding the position of the substituent, the steric hindrance tends to be caused when the position adjacent to the position of the bonding of the aromatic ring (the ortho-position in the case of benzene). Therefore, it is preferable to avoid such the substituent and the position thereof.

Examples of the substituent include a halogen atom such as F, Cl, Br and I, a hydroxyl group, a carboxyl group, a cyano group, an amino group, a sulfo group, a carbamoyl group, a sulfamoyl group, a ureido group, an alkyl group, an alkenyl group, an alkynyl group, an aliphatic acyl group, an aliphatic acyloxy group, an alkoxyl group, an alkoxycarbonyl group, an alkoxycarbonylamino group, an alkylthio group, an alkylsulfonyl group, an aliphatic amido group, an aliphatic sulfonamido group, an aliphatic amino group, an aliphatic carbamoyl group, an aliphatic sulfamoyl group, an aliphatic ureido group and non-aromatic heterocyclic group.

The number of carbon atom in the aliphatic acyl group is preferably from 1 to 10. Examples of the aliphatic acyl group include an acetyl group, a propanoyl group and a butanoyl group. The number of carbon atom in the aliphatic acyloxy group is preferably from 1 to 10. Examples of the aliphatic acyloxy group include an acetoxyl group. The number of carbon atom in the aliphatic alkoxyl group is preferably from 1 to 8. The alkoxyl group further may have a substituent such as an alkoxyl group. Examples of the alkoxyl group (including a substituted alkoxyl group) include a methoxy group, an ethoxy group, a butoxy group and a methoxyethoxy group. The number of carbon atom in the alkoxycarbonyl group is preferably from 2 to 10. Examples of the alkoxycarbonyl group include a methoxy carbonyl group and an ethoxycarbonyl group.

The number of carbon atoms in the alkylthio group is preferably from 1 to 12. Examples of the alkylthio group include a methylthio group, an ethylthio group and an octylthio group. The number of carbon atoms in the alkylsulfonyl group is preferably from 1 to 8. Examples of the alkylsulfonyl group include a methanesulfonyl group and an ethanesulfonyl group. The number of carbon atoms in the aliphatic amido group is preferably from 1 to 10. Examples of the aliphatic amido group include an acetoamido group. The number of carbon atoms in the aliphatic sulfonamido group is preferably from 1 to 8. Examples of the aliphatic sulfonamido group include a methanesulfonamido group, a butanesulfonamido group and an n-octanesulfonamido group. The number of carbon atoms in the aliphatic group-substituted amino group is preferably from 1 to 10. Examples of the aliphatic group-substituted amino group include a dimethylamino group, a diethylamino group and a 2-carboxyethylamino group. The number of carbon atoms in the aliphatic group-substituted carbamoyl group is preferably from 1 to 10. Examples of the aliphatic group-substituted carbamoyl group include a methylcarbamoyl group and a diethylcarbamoyl group. The number of carbon atoms in the aliphatic group-substituted sulfamoyl group is preferably from 1 to 8. Examples of the aliphatic group-substituted sulfamoyl group include a methylsulfamoyl group and a diethylsulfamoyl group. The number of carbon atoms in the aliphatic group-substituted ureido group is preferably from 1 to 10. Examples of the aliphatic group-substituted ureido group include a methyl group. Examples of the non-aromatic heterocyclic group include a piperidino group and a morpholino group.

The molecular weight of these compounds is preferably from 300 to 800. The boiling point of them is preferably not less than 260° C. The boiling point can be measured by a measuring apparatus available on the market such as TG/DTA110, manufactured by Seiko Denshi Kogyo Co., Ltd. Concrete examples are listed below, but the compounds are not limited thereto.

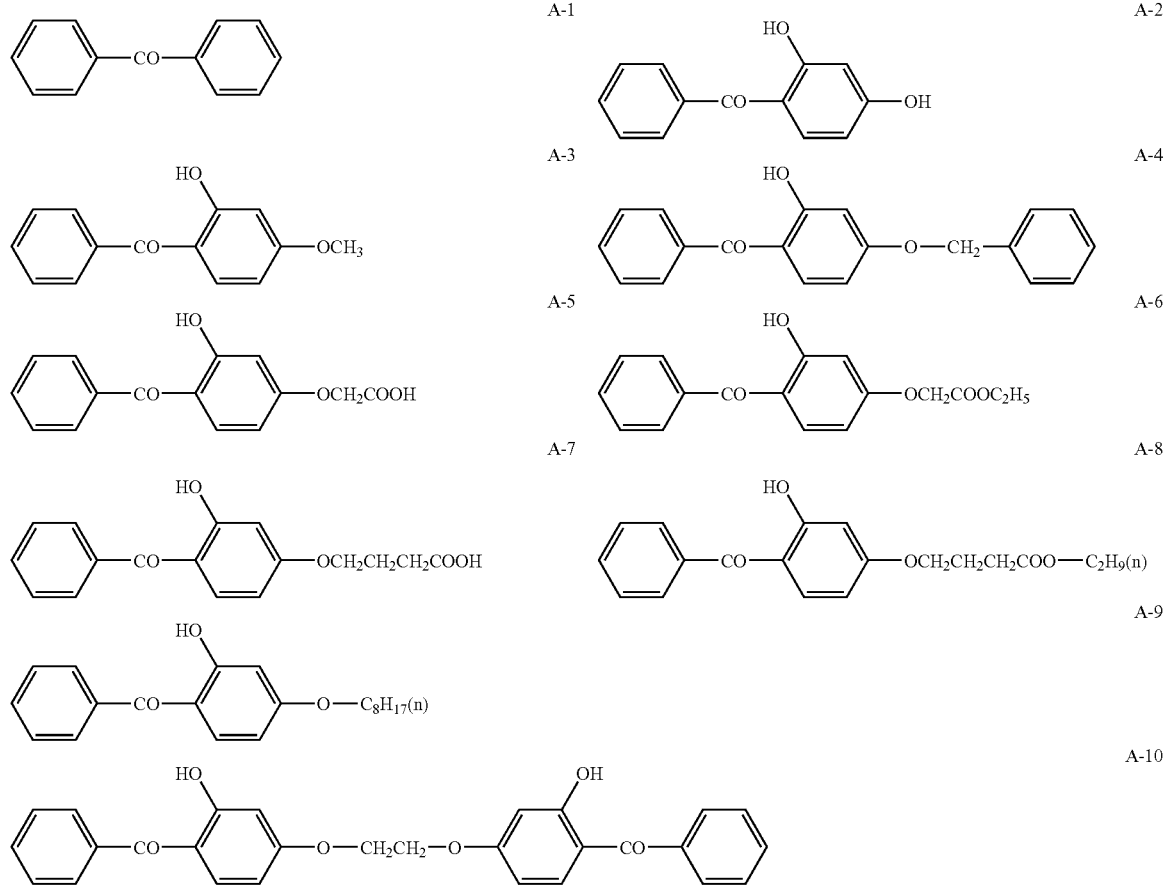

-continued
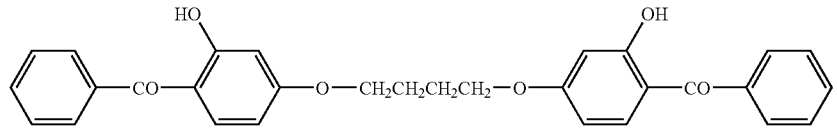
A-11
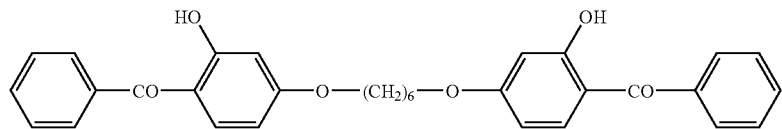
A-12
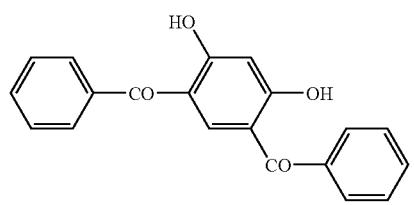
A-13
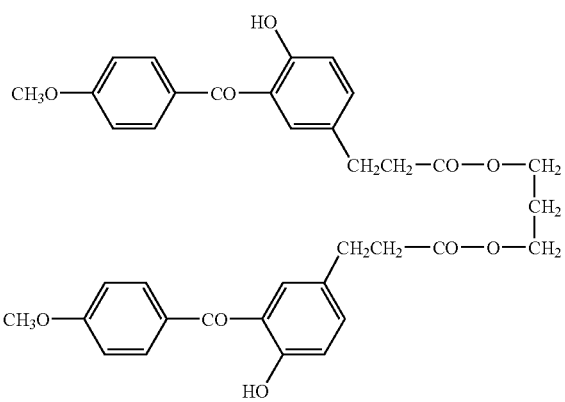
A-14
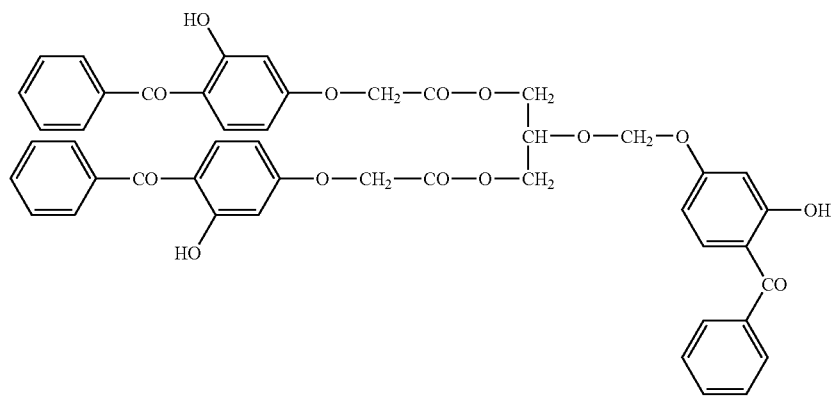
A-15
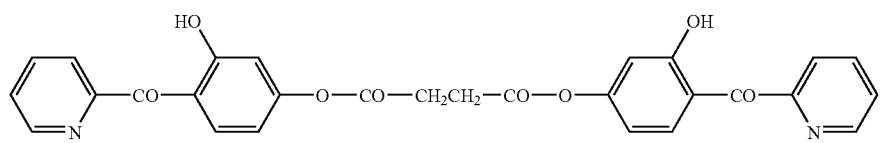
A-16
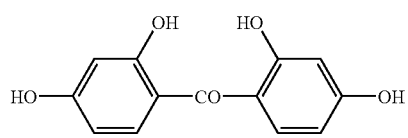
A-17
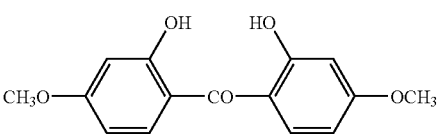
A-18
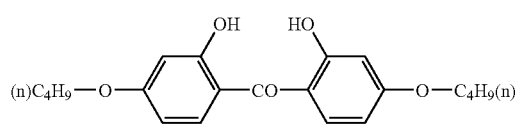
A-19
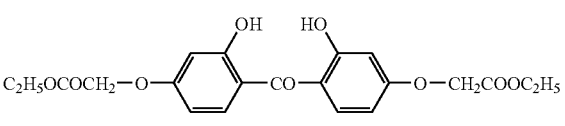
A-20

-continued
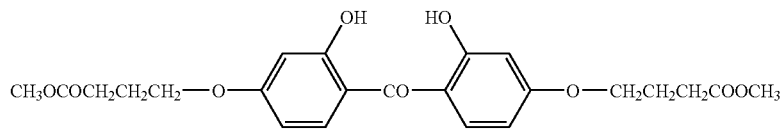
A-21
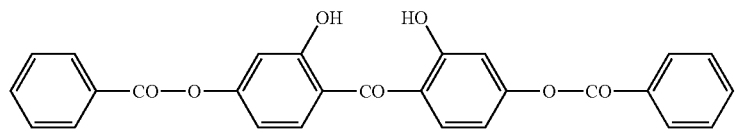
A-22
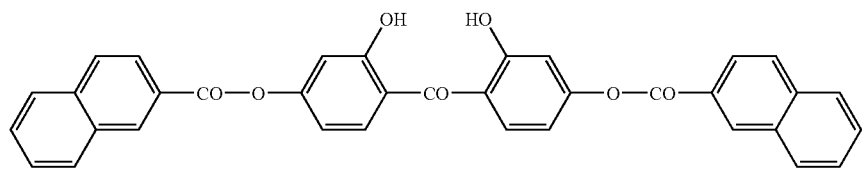
A-23
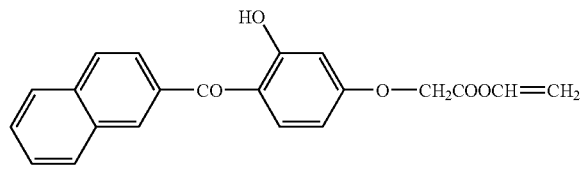
A-24
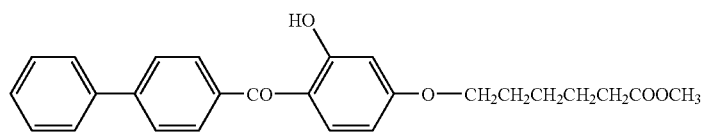
A-25
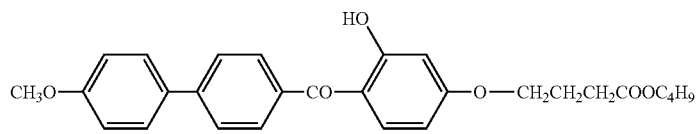
A-26
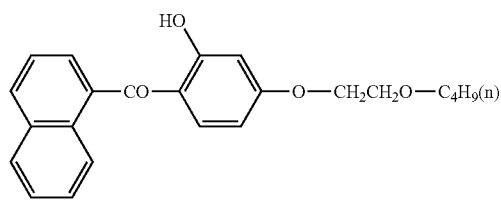
A-27
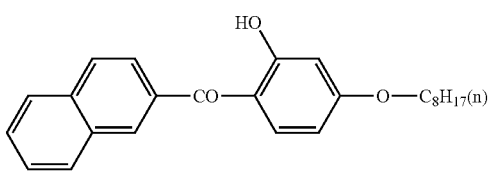
A-28
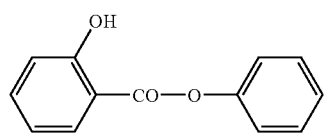
A-29
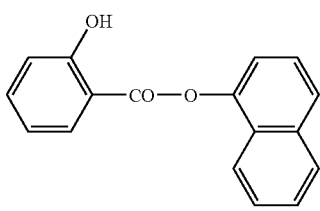
A-30
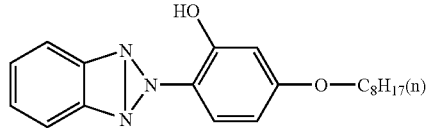
A-31
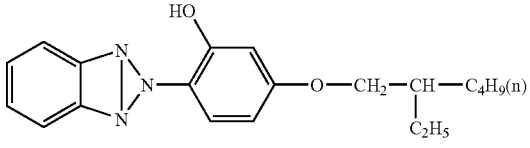
A-32

-continued
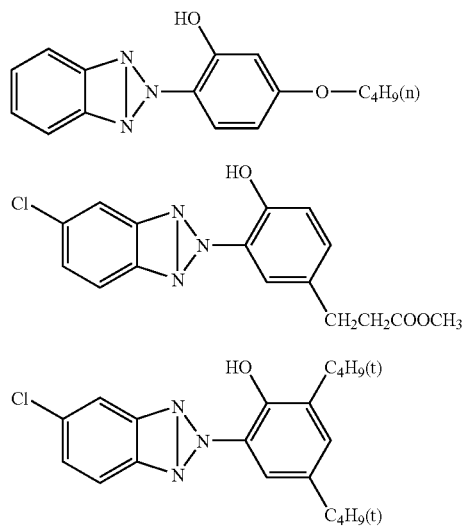
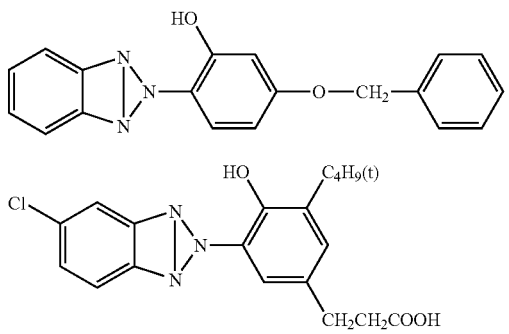
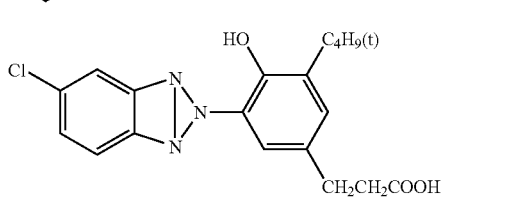
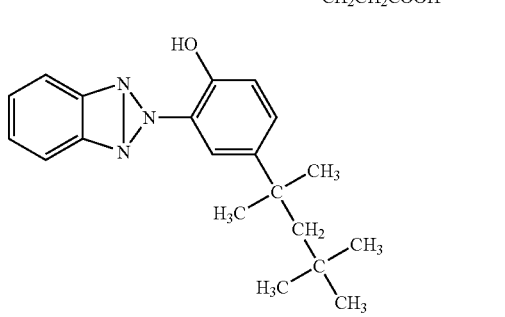
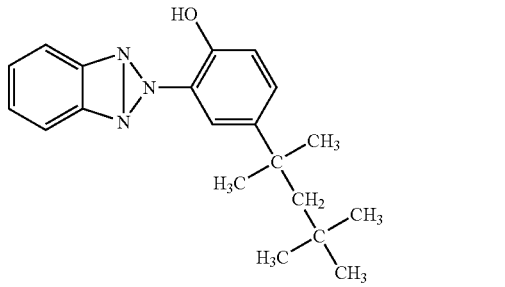
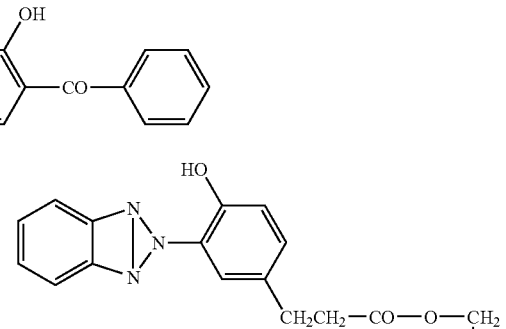
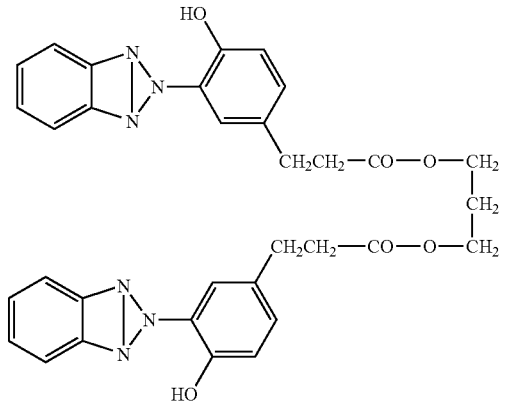
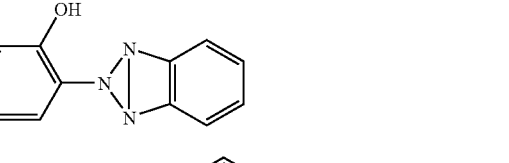
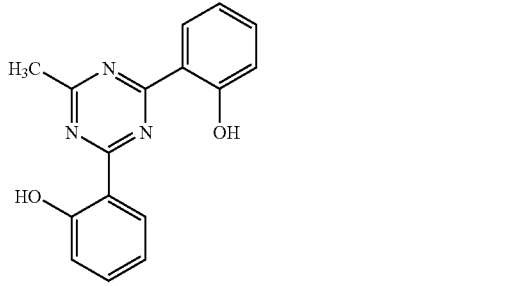

-continued
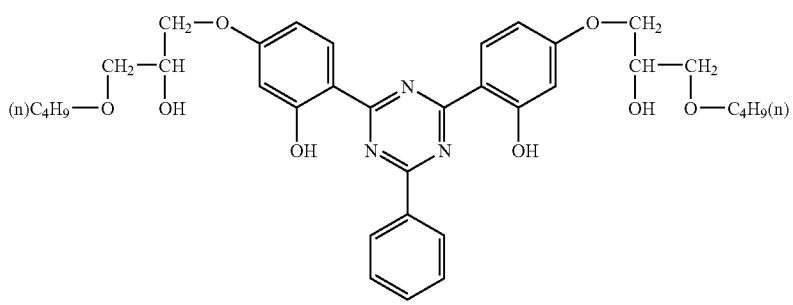
A-45
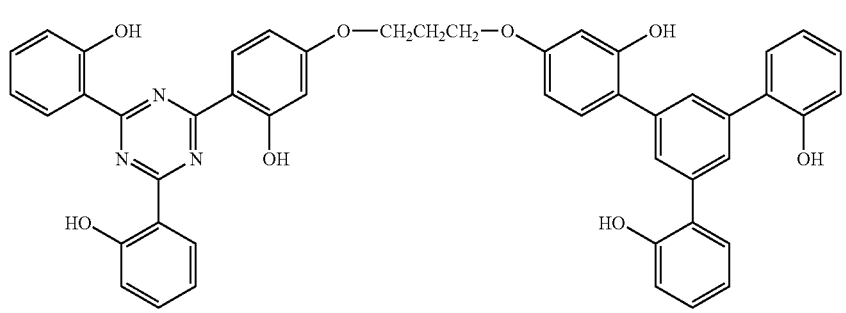
A-46
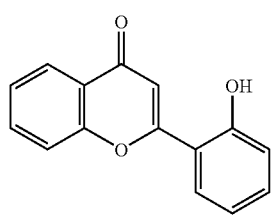
A-47
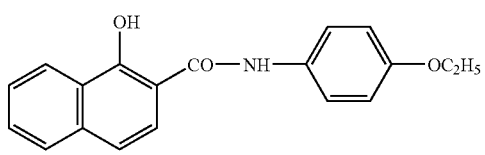
A-48
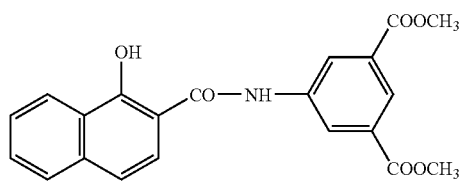
A-49
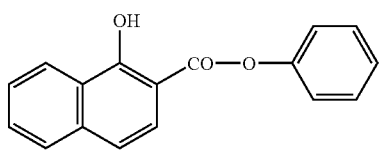
A-50
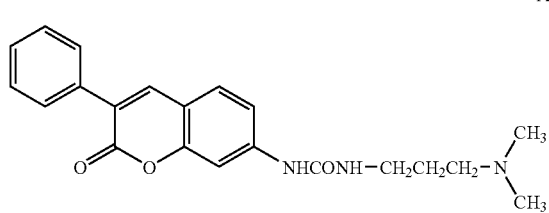
A-51
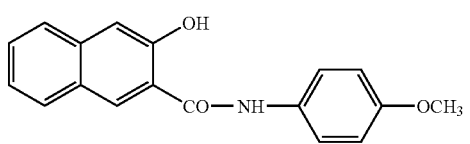
A-52
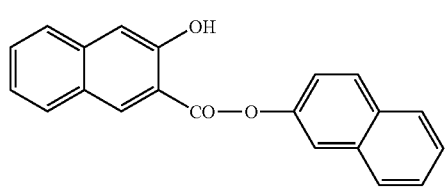
A-53
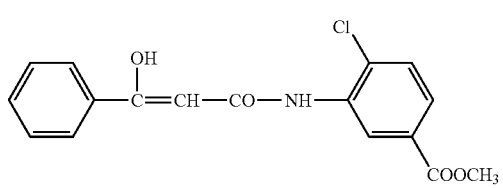
A-54
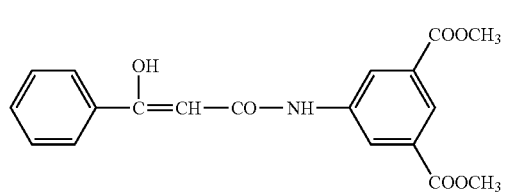
A-55
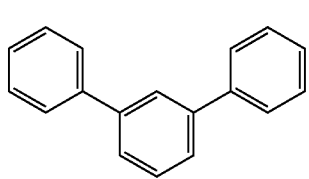
A-56

-continued
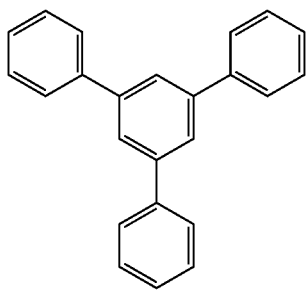
A-57
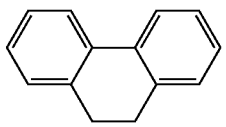
A-58
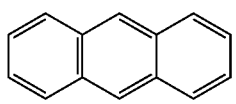
A-59
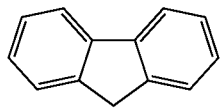
A-60
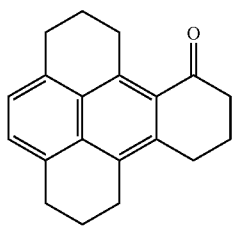
A-61
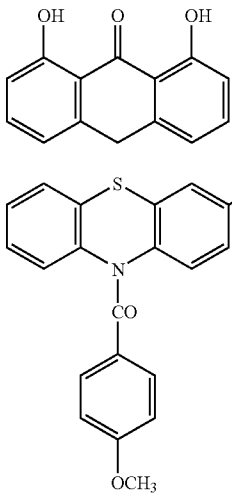
A-62
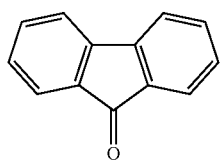
A-63
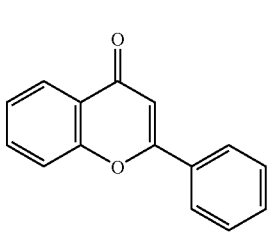
A-64
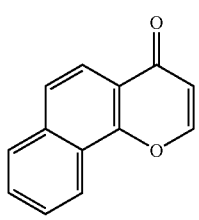
A-65
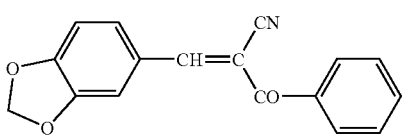
A-66
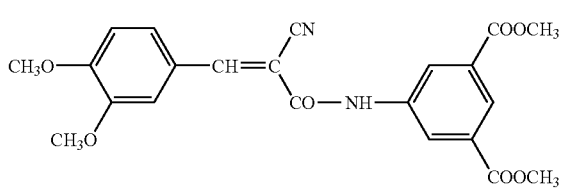
A-67
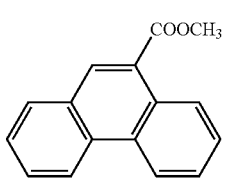
A-68
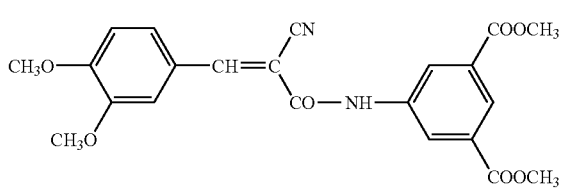
A-69
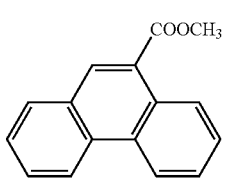
A-70

-continued
A-71
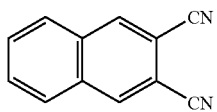
A-72
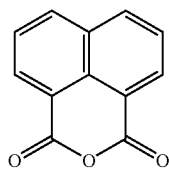
A-73
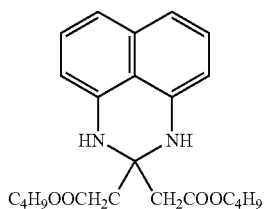
A-74
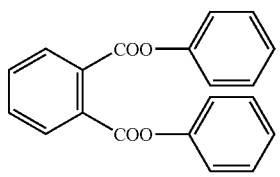
A-75
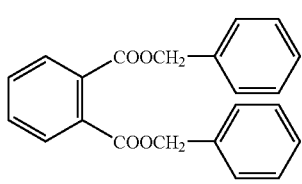
A-76
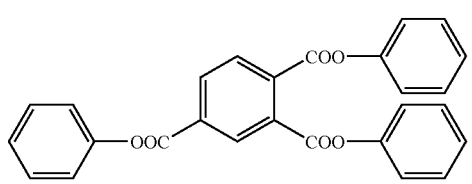
A-77
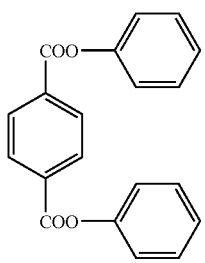
A-78
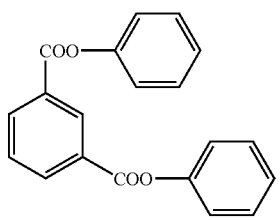
A-79
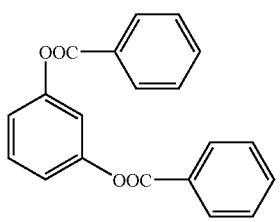
A-80
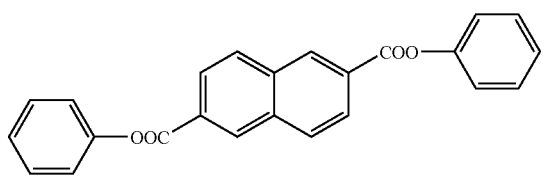
A-81
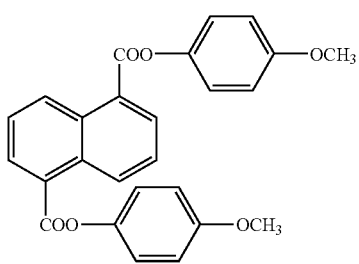
A-82
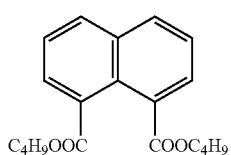

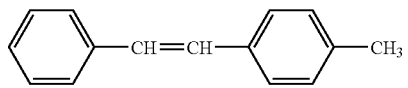
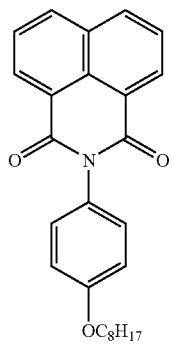
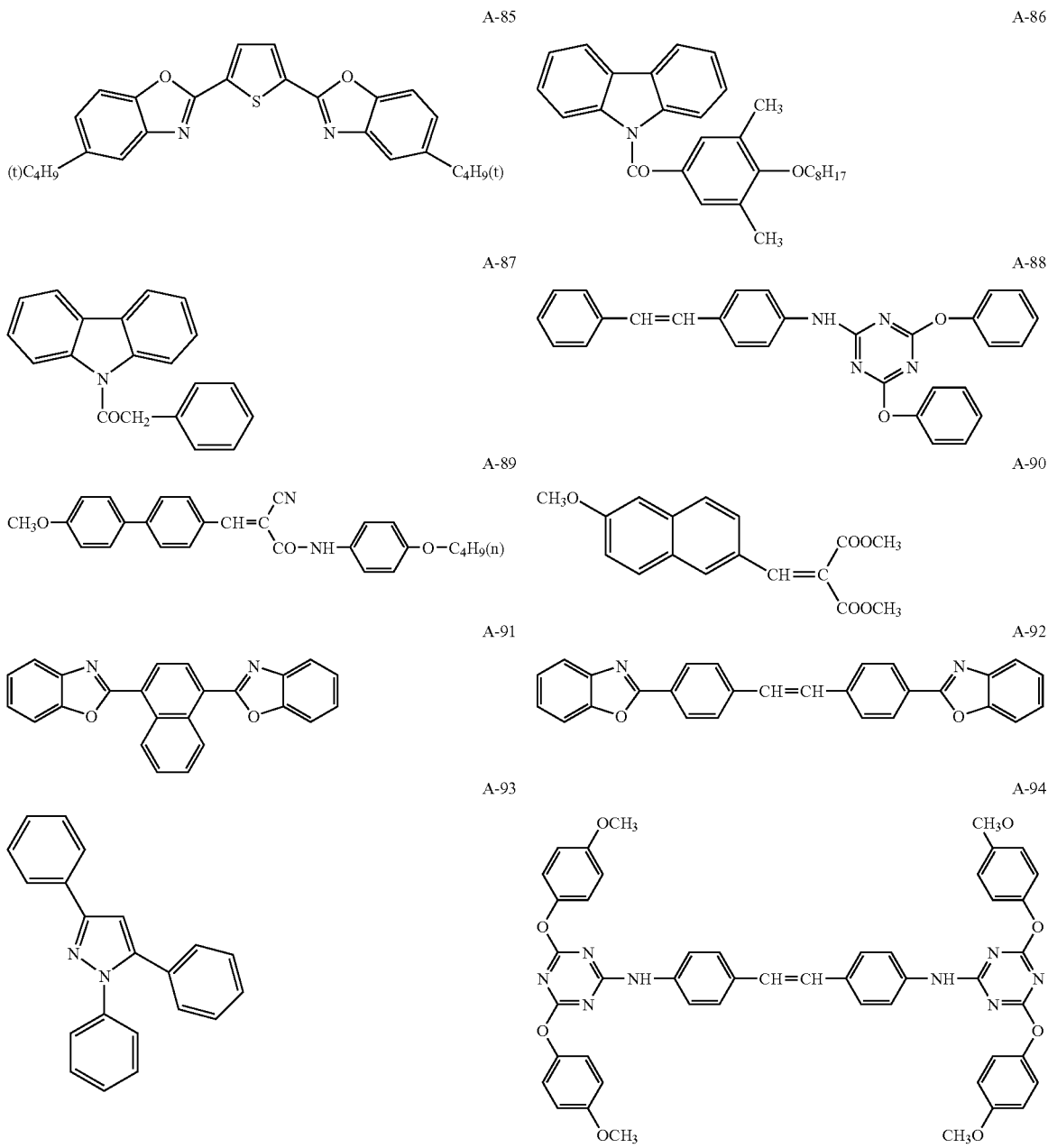

Moreover, a compound having a triphenylene ring represented by the following Formula 1 is also preferably employed as the compound which has at least two aromatic rings having a planar structure to be employed in the invention.

Formula 1

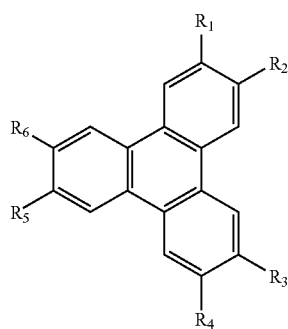

In Formula 1, $R_1$, $R_2$, $R_3$, $R_4$, $R_5$ and $R_6$ are each independently a hydrogen atom, a halogen atom, a nitro group, a sulfo group, an aliphatic group, an aromatic group, a heterocyclic group, an —O—$R_{11}$ group, an —S—$R_{12}$ group, a —CO—$R_{13}$ group, an —O—CO—$R_{14}$ group, a —CO—O—$R_{15}$ group, an —O—CO—O—$R_{16}$ group, an —N$R_{17}R_{18}$ group, a —CO—N$R_{19}R_{20}$ group, an —N$R_{21}$—CO—$R_{22}$ group, an —O—CO—N$R_{23}R_{24}$ group, an —Si$R_{25}R_{26}R_{27}$ group, an —O—Si—$R_{28}R_{29}R_{30}$ group, an —S—CO—$R_{31}$ group, an —O—$SO_2$—$R_{32}$ group, an —SO—$R_{33}$, an —N$R_{34}$—CO—O—$R_{35}$ group, an —SO$_2$—$R_{36}$ group or an —N$R_{37}$—CO—N$R_{38}R_{39}$ group; and $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, $R_{32}$, $R_{33}$, $R_{34}$, $R_{35}$, $R_{36}$, $R_{37}$, $R_{38}$, and $R_{39}$ are each independently a hydrogen atom, an aliphatic group, an aromatic group or a heterocyclic group; and $R_1$ and $R_2$, $R_3$ and $R_4$, or $R_5$ and $R_6$ may be bonded to form a ring.

$R_1$, $R_2$, $R_3$, $R_4$, $R_5$ and $R_6$ are preferably the —O—$R_{11}$ group, —S—$R_{12}$, —O—CO—$R_{14}$ group, —O—CO—O—$R_{16}$ group, an —N$R_{17}R_{18}$ group, —N$R_{21}$—CO—$R_{22}$ group or —O—CO—N$R_{23}R_{24}$ group, more preferably the —O—$R_{11}$ group, —S—$R_{12}$, —O—CO—$R_{14}$ group, —O—CO—O—$R_{16}$ group or —O—CO—N$R_{23}R_{24}$ group, further preferably the —O—$R_{11}$, or —O—CO—$R_{14}$ group, and most preferably the —O—CO—$R_{14}$ group.

$R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, $R_{32}$, $R_{33}$, $R_{34}$, $R_{35}$, $R_{36}$, $R_{37}$, $R_{38}$ and $R_{39}$ are preferably a hydrogen atom, an aliphatic group or an aromatic group.

$R_{14}$ in the —O—CO—$R_{14}$ group is most preferably an aromatic group. In Formula 1, $R_1$, $R_2$, $R_3$, $R_4$, $R_5$ and $R_6$ are preferably the same group.

In the invention, the aliphatic group is an alkyl group, an alkenyl group, an alkynyl group, a substituted alkyl group, a substituted alkenyl group and a substituted alkynyl group. The alkyl group may be a cyclic group (a cycloalkyl group). The alkyl group may have a branch. The number of carbon atom in the alkyl group is preferably from 1 to 30, more preferably from 1 to 20, and most preferably from 1 to 10. Examples of the alkyl group include a methyl group, an ethyl group, an i-propyl group, a butyl group, an i-butyl group, an s-butyl group, a t-butyl group, a t-pentyl group, a hexyl group, an octyl group, a t-octyl group, a dodecyl group and a tetracosyl group. The alkenyl group may be a cyclic group (a cycloalkenyl group). The alkenyl group may have a branch. The alkenyl group may have two or more double bonds.

The number of carbon atom in the alkenyl group is preferably from 2 to 30, more preferably from 2 to 20, and most preferably from 2 to 10. Examples of the alkenyl group include a vinyl group, an allyl group and a 3-heptenyl group. The alkynyl group may be a cyclic group (a cycloalkynyl group). The alkynyl group may have a branch. The alkynyl group may have two or more triple bonds. The number of carbon atom in the alkynyl group is preferably from 2 to 30, more preferably from 2 to 20, and most preferably from 2 to 10. Examples of the alkynyl group include an ethynyl group, a 2-propynyl group and a 2,4-octadynyl group.

Examples of the substituent of the alkyl group, alkenyl group and alkynyl group include a halogen atom, a nitro-group, a sulfo group, an aromatic group, a heterocyclic group, an —O—$R_{41}$ group, an —S—$R_{42}$ group, a —CO—$R_{43}$ group, an —O—CO—$R_{44}$ group, a —CO—O—$R_{45}$ group, an —O—CO—O—$R_{46}$ group, an —N$R_{47}R_{48}$ group, a —CO—N$R_{49}R_{50}$ group, an —N$R_{51}$—CO—$R_{52}$ group, an —O—CO—N$R_{53}R_{54}$ group, an —Si$R_{55}R_{56}R_{57}R_{58}$ group, and an —O—Si$R_{59}R_{60}R_{61}R_{62}$ group. $R_{41}$, $R_{42}$, $R_{43}$, $R_{44}$, $R_{45}$, $R_{46}$, $R_{47}$, $R_{48}$, $R_{49}$, $R_{50}$, $R_{51}$, $R_{52}$, $R_{53}$, $R_{54}$, $R_{55}$, $R_{56}$, $R_{57}$, $R_{58}$, $R_{59}$, $R_{60}$, $R_{61}$ and $R_{62}$ are each independently a hydrogen atom, an aliphatic group, an aromatic group or a heterocyclic group.

The alkyl moiety of the substituted alkyl group is the same as the foregoing alkyl group. Examples of the substituted alkyl group include a benzyl group, a phenethyl group, a methoxyetyl group, an ethoxymethyl group, a 2-(2-methoxyethoxy)ethyl group, a 2-hydroxyethyl group, a hydroxymethyl group, a 2-carboxyethyl group, a carboxymethyl group, an ethoxycarbonylmethyl group, a 4-acryloyloxybutyl group, a trichloromethyl group and a perfluoropentyl group. The alkenyl moiety of the substituted alkenyl group is the same as the foregoing alkenyl group. Examples of the substituted alkenyl group include a styryl group and 4-methoxystyryl group. The alkynyl moiety of the substituted alkynyl group is the same as the foregoing alkynyl group. Examples of the substituted alkynyl group include a 4-butoxyphenylethynyl group, a 4-propylphenylethynyl group and a trimethylsilyethynyl group.

In the invention, the aromatic group is an aryl group and a substituted aryl group. The number of carbon atom in the aryl group is preferably from 6 to 30, more preferably from 6 to 20, and most preferably from 6 to 10. Examples of the aryl group include a phenyl group, a 1-naphthyl group and a 2-naphthyl group. Examples of the substituent of the substituted aryl group include a halogen atom, a nitro group, a sulfonic acid group, an aliphatic group, an aromatic group, a heterocyclic group, an —O—$R_{71}$ group, an —S—$R_{72}$ group, a —CO—$R_{73}$ group, an —O—CO—$R_{74}$ group, a —CO—O—$R_{75}$ group, an —O—CO—$R_{76}$ group, an —N$R_{77}R_{78}$ group, a —CO—N$R_{79}R_{80}$ group, an —N$R_{81}$—CO—$R_{82}$ group, an —O—CO—N$R_{83}R_{84}$ group, an —Si$R_{85}R_{86}R_{87}R_{88}$ group and an —O—Si$R_{89}R_{90}R_{91}R_{92}$. $R_{71}$, $R_{72}$, $R_{73}$, $R_{74}$, $R_{75}$, $R_{76}$, $R_{77}$, $R_{78}$, $R_{79}$, $R_{80}$, $R_{81}$, $R_{82}$, $R_{83}$, $R_{84}$, $R_{85}$, $R_{86}$, $R_{87}$, $R_{88}$, $R_{89}$, $R_{90}$, $R_{91}$ and $R_{92}$ are each independently a hydrogen atom, an aliphatic group, an aromatic group or a heterocyclic group.

The aryl moiety of the substituted aryl group is the same as the foregoing aryl group. Examples of the substituted aryl group include a p-bipenylyl group, a 4-phenylethynylphenyl group, a 2-methoxyphenyl group, a 3-methoxyphenyl group, a 4-methoxyphenyl group, a 2-ethxyphenyl group, a 3-ethoxyphenyl group, a 4-ethoxyphenyl group, a 2-propoxyphenyl group, a 3-propoxyophenyl group, a 4-propoxylphenyl group, a 2-butoxyphenyl group, a 3-butoxyphenyl group, a 4-butoxyphenyl group, a 2-hexyloxyphenyl group, a 3-hexyloxyphenyl group, a 4-hexyloxyphenyl group, a 2-octyloxyphenyl group, a 3-octyloxyphenyl group, a 4-octyloxyphenyl group, a 2-dodecyloxphenyl group, a 3-dodecyoxyphenyl group, a 4-dodecyloxyphenyl group, a 2-tetracosyloxyphenyl group, a 3-tetracosyloxyphenyl group, a 4-tetracosyloxyphenyl group, a 3,4-dimethoxyphenyl group, a 3,4-diethoxyphenyl group, a 3,4-dihexyloxyphenyl group, a 2,4-dimethoxyphenyl group, a 2,4-diethoxyphenyl group, a 2,4-dihexyloxyphenyl group, a 3,5-dimethoxyphenyl group, a 3,5-dimethoxyphenyl group, a 3,5-dihexyloxyphenyl group, a 3,4,5-trimethoxyphenyl group, a 3,4,5-triethoxyphenyl group, a 3,4,5-trihexyloxyphenyl group, a 2,4,6-trimethoxyphenyl group, a 2,4,6-triethoxyphenyl group, 2,4,6-trihexyloxyphenyl group, a 2-fluorophenyl group, a 3-fluorophenyl group, a 4-fluorophenyl group, a 2-chlorophenyl group, a 3-chlorophenyl group, a 4-chlorophenyl group, a 2-bromphenyl group, a 3-bromophenyl group, a 4-bromophenyl group, a 3,4-difluorophenyl group, a 3,4-dichlorophenyl group, a 3,4-dibromophenyl group, a 2,4-difluorophenyl group, a 2,4-dichloorophenyl group, a 2,4-dibromophenyl group, a 3,5-difluorophenyl group, a 3,5-dichlorophenyl group, a 3,5-dibromophenyl group, a 3,4,5-trifluorophenyl group, a 3,4,5-trichlorophenyl group, a 3,4, 5-tribromophenyl group, a 2,4,6-trifluorophenyl group, a 2,4,6-trichlorophenyl group, a 2,4,6-tribromophenyl group, a pentafluorophenyl group, a pentachlorophenyl group, a pentabromophenyl group, a 2-iodophenyl group, a 3-iodophenyl group, a 4-iodophenyl group, a 2-formylphenyl group, a 3-formylphenyl group, a 4-formylphenyl group, a 2-benzooylphenyl group, 3-benzooylphenyl group, 4-benzooylphenyl group, a 2-carboxyphenyl group, a 3-carboxyphenyl group, a 4-carboxyphenyl group, an o-tolyl group, a m-tolyl group, a p-tolyl group, a 2-ethylphenyl group, a 3-ethylphenyl group, a 4-ethylphenyl group, a 2-(2-methoxyethoxy)phenyl group, a 3-(2-methoxyethoxy)phenyl group, a 4-(2-methoxyethoxy)phenyl group, a 2-ethoxycarbonylphenyl group, a 3-ethoxycarbonylphenyl group, a 4-ethoxycarbonylphenyl group, a 2-benzoyloxyphenyl group, a 3-benzoyloxyphenyl group and a 4-benzoyloxyphenyl group.

In the invention, the heterocyclic group may have a substituent. The heterocyclic ring of the heterocyclic group is preferably a five-member or six-member ring. The hetero cyclic ring of the heterocyclic group may be condensed with an aliphatic ring, an aromatic ring or another heterocyclic ring. Examples of the hetero atom of the heterocyclic ring include B, N, O S, Se and Te. Examples of the heterocyclic group include a pyrrolidone ring, a morpholine ring, a 2-bora-1,3-dioxorane ring and a 1,3-thiazolidine ring. Examples of the unsaturated heterocyclic ring include an imidazole ring, a thiazole ring, a benzothiazole ring, a benzoxazole ring, a benzotriazole ring, a benzoselenazole ring, a pyridine ring, a pyrimidine ring and a quinoline ring. Examples of the substituent include are the same as the substituent of the substituted aryl group.

The molecular weight of the compound having the triphenylene ring is preferably from 300 to 2,000. The boiling point of the compound is preferably not less than 260° C. The boiling point can be measured by an apparatus available on the market, for example, TG/DTA100 manufactured by Seiko Denshi Kogyo Co., Ltd. Concrete examples of R of a compound represented by the following Formula 2 are shown below; these compounds have a triphenylene ring represented by Formula 1 in which the substituents represented by $R_1$ through $R_6$ are the same with together.

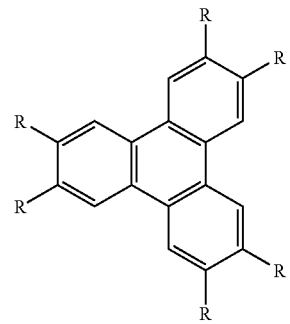

Formula 2

The followings can be cited as the group represented by R: (B-1) a fluorine atom, (B-2) a chlorine, (B-3) a bromine, (B-4) a formyl group, (B-5) a benzoyl group, (B-6) a carboxyl group, (B-7) a butylamino group, (B-8) a benzylamino group, (B-9) a trimethylsilyloxy group, (B-10) a 1-pentynyl group, (B-11) an thoxycarbonyl group, (B-12) a 2-hydroxyethoxycarbonyl group, (B-13) a phenoxycarbonyl group, (B-14) an N-phenyl carbamoyl group, (B-15) an N,N-diethylcarbamoyl group, (B-16) a 4-methoxybenzoyloxy group, (B-17) an N-phenylcarbamoyloxy group, (B-18) a hexyloxy group, (B-19) a 4-hexyloxybenzoyloxy group, (B-20) an ethoxy group, (B-21) a benzoyloxy group, (B-22) a m-dodecyloxyphenylthio group, (B-23) a t-octyl group, (B-24) a p-fluorobenzoylthio group, (B-25) an isobutylylthio group, (B-26) a p-fluorobenzoylthio group, (B-27) a methanesulfonyl group, (B-28) a benzenesulfonyl group, (B-29) a methanesulfonyl group, (B-30) a methoxyethoxy group, (B-31) a propoxy group, (B-32) a 2-hydroxyethoxy group, (B-33) a 2-carboxyethoxy group, (B-34) a 3-heptenyloxy group, (B-35) a 2-phenylethox group, (B-36) a trichloromethoxy group, (B-37) a 2-propynyloxy group, (B-38) a 2,4-octadinyloxy group, (B-39) a perfluoropentyloxy-group, (B-40) a an ethoxycarbonylmethoxy group, (B-41) a p-methoxyphenoxy group, (B-42) a m-ethoxyphenoxy group, (B-43) an o-chlorophenoxy group, (B-44) a m-dodecyloxyphenoxy group, (B-45) a 4-pyridyloxy group, (B-46) a pentafluorobenzoyloxy group, (B-47) a p-hexyloxybenzoyloxy group, (B-48) a 1-naphthoyloxy group, (B-49) a 2-naphthoyloxy group, (B-50) a 5-imidazolecarbonyloxy group, (B-51) an o-phenoxycarbonylbenzoyloxy group, (B-52) a m-(2-methoxyethoxy)benzoyloxy group, (B-53) an o-carboxybenzoyloxy group, (B-54) a p-formylbenzoyloxy group, (B-55) a m-ethoxycarbonylbenzoyloxy group, (B-56) a p-pivaloylbenzoyloxy group, (B-57) a porpionyloxy group, (B-58) a phenylacetoxy group, (B-59) a cinnamoyloxy group, (B-60) a hydroxyacetoxy group, (B-61) an ethoxycarbonylacetoxy group, (B-62) a m-butoxyphenylpropioloyloxy group, (B-63) a propioloyoxy group, (B-64) a trimethylsilylpropioloyloxy group, (B-65) a 4-octenoyloxy group, (B-66) a 3-hydroxypropionyloxy group, (B-67) a 2-methoxyethoxyacetoxy group, (B-68) a perfluorobutylyloxy group, (B-69) a methanesulfonyloxy group, (B-70) a p-toluenesulfonyloxy group, (B-71) a triethylsilyl group, (B-72) a m-butoxyphenoxycarbonylamino group, (B-73) a hexyl group, (B-74) a phenyl group, (B-75) a 4-pyridyl group, (B-76) a benzyloxycarbonyloxy group, (B-77) a m-chlorobenzamido group, and (B-78) a 4-methylanilino group. Concrete examples of R of a compound represented by the following Formula 3 are shown below; these compounds have a triphenylene ring represented by Formula 1 in which five of the substituents represented by $R_1$ through $R_6$ are each a hydrogen atom and six of them are the same with together.

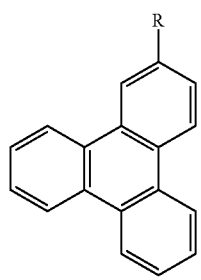

Formula 3

As R, (B-79) a nitro group, (B-80) a sulfo group, (B-81) a formyl group, (B-82) a carboxy group, (B-83) a methoxycarbony group, (B -84) a benzyloxycarbonyl group and (B-85) a phenoxycarbonyl group can be cited.

Concrete examples of R of a compound represented by the following Formula 4 are shown below; these compounds have a triphenylene ring represented by Formula 1 in which $R_1$ is a hydroxyl group and the substituent represented by $R_2$ through $R_6$ are the same with together.

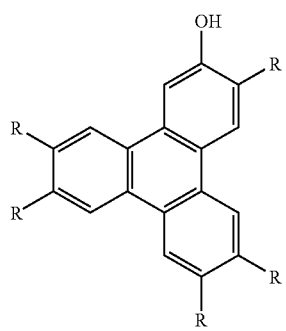

Formula 4

As R, (B-86) a butoxy group, (B-87) a group a hexyloxy group, (B-88) a dodecyloxy group, (B-89) a hexanoyloxy group and (B-90) a carboxymethoxy group can be cited.

Furthermore, the following B-91 through B-100 can be cited as other examples of $R_1$ through $R_5$ of Formula 1.

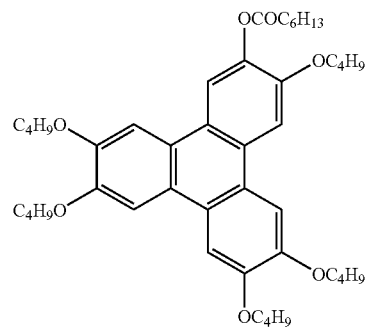

B-91

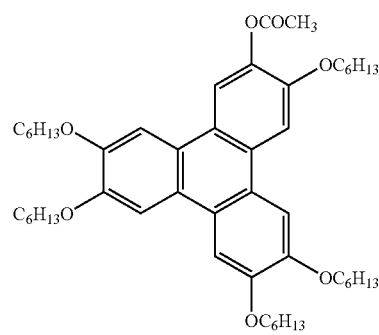

B-92

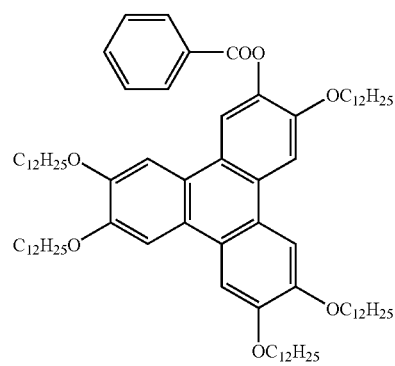

B-93

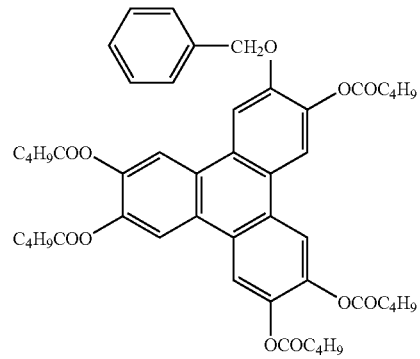

B-94

-continued

B-95
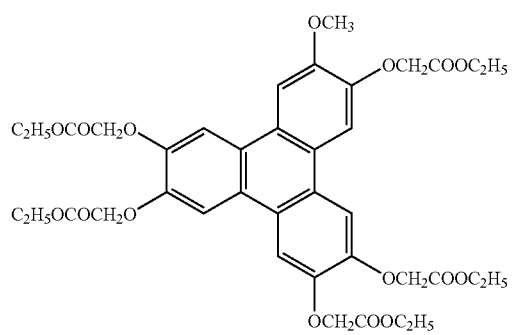

B-96
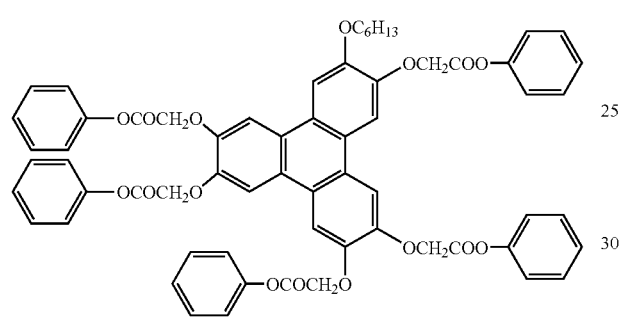

B-97
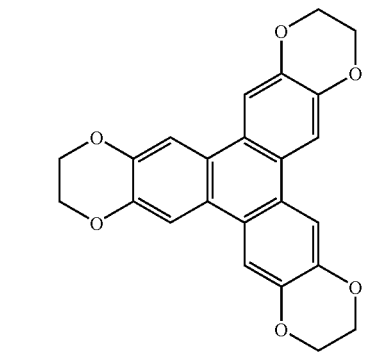

B-98
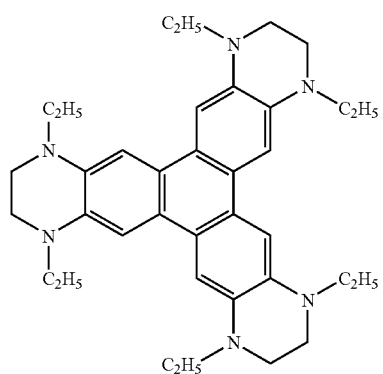

-continued

B-99
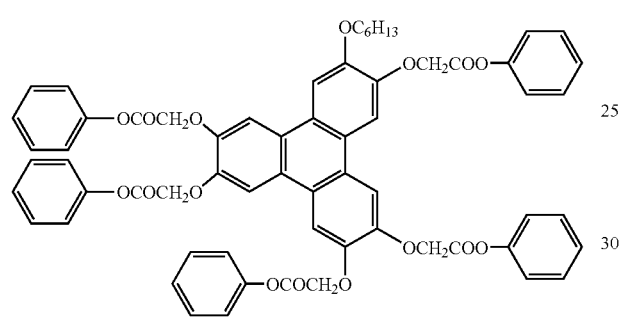

B-100
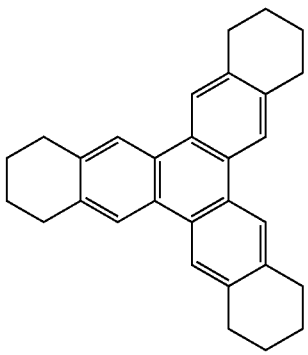

The adding amount of the compound having at least two aromatic rings which have a planar structure is preferably from 0.4 to 10% by weight, and more preferably from 1.5 to 10% by weight of the cellulose ester dope from the viewpoint of prevention of bleed out. The content in the cellulose ester film is preferably from 0.01 to 20% by weight, and more preferably from 5 to 20% by weight to 100 parts by weight of the cellulose ester.

A degradation preventing agent such as an antioxidant and a radical scavenger is preferably contained-in the cellulose ester film for preventing the degradation of the cellulose ester film to be used for the liquid crystal displaying apparatus relating to the invention.

A hindered phenol type compound is preferably employed as the degradation preventing agent, for example, 2,6-di-t-butyl-p-cresol, pentaerythrytol-tetrakis[3-(3,5-di-t-butyl-4-hyfroxyphenyl)propionate], triethylene glycol-bis[3-(3-t-butyl-5-methyl-4-hydroxyphenyl) propionate], 1,6-hexanediol-bis[3-(3,5-t-butyl-4-hydroxyphenyl)propionate, 2,4-bis(n-octylthio)-6-(4-hydroxy-3,5-di-t-butylanilino)-1, 3,5-triazine, 2,2-thio-diethylene-bis[3-(3,5-di-t-butyl-4-hydroxyphenyl) propionate], octadecyl-3-(3,5-di-t-butyl-4-hydroxyphenyl)propionate, N,N'-hexamethylene-bis(3,5-di-t- butyl-4-hydroxy-hydrocinnamide), 1,3,5-trimethyl-2,4,6-tris(3,5-di-t-butyl-4-hysroxybenzyl)-benzene and tris-(3,5-di-t-butyl-4-hysroxybenzyl)-isocyanurate are preferable. Furthermore, for example, a hydrazine type metal inactivating agent such as N,N'-bis[3-(3,5-di-t-butyl-4-hydrooxyphenyl)propionyl]hydrazine and a phosphor type process stabilizing agent such as tris(2,4-di-t-butylphenyl)phosphite may be employed together with the above-mentioned. Adding amount of these compounds is preferably from 1 ppm to 1.0%, and more preferably from 10 to 1,000 ppm, in weight ratio.

For preventing degradation of the cellulose ester film relating to the invention caused by UV rays, a UV absorbent capable of weakening or cutting UV rays irradiating to the liquid crystal displaying apparatus is preferably contained in the film additionally to the above degradation preventing agent. As the UV absorbent, one having excellent absorbing ability for UV rays of not more than 370 nm and low absorptivity for visible rays not less than 400 nm is preferred. For example, an oxybenzophenone compound, a benzotriazole compound, an alicylic acid ester compound, a benzophenone compound, a cyanoacrylate compound and a nickel complex compound are employable. The benzotriazole type compounds and the benzophenone type compounds are particularly preferable UV absorbent. Among them, the benzotriazole type compounds are preferable since unnecessary coloring to the cellulose ester is low. For example, Tinubin 109, Tinubin 171, Tinubin 327 and Tinubin 328, manufactured by Ciba Specialty Chemicals Co., Ltd., are preferably employed. However, the adding amount of them is from 0.01 to 5% by weight, and preferably from 0.13 to 3%, by weight to the cellulose ester since the low molecular weight UV absorbent is separated sometimes in the web in the course of the film producing similar to a plasticizer or evaporated depending on the adding amount. These UV absorbents include ones overlapping with the compounds effective to the invention, which have at least two aromatic rings having planar structure.

In the invention, the cellulose ester film preferably contains fine particles. Inorganic fine particles such as silicon dioxide, titanium dioxide, aluminum oxide, zirconium oxide, calcium carbonate, kaolin, talk, burned calcium silicate, aluminum silicate, magnesium silicate and calcium phosphate, or crosslinked polymer fine particles are preferably contained. Among them, silicon dioxide is preferred since the haze of the film can be reduced. The average diameter of the secondary particles of the fine particle is preferably from 0.01 to 1.0 μm and the content is preferably 0.005 to 0.3% by weight to the cellulose ester. In many cases, the fine particle such as that of silicon dioxide is treated by an organic compound; such the particles are preferred since the haze of the film can be reduced. As the organic compound for the surface treatment, a halosilane compound, an alkoxysilane compound (particularly an alkoxysilane having a methyl group), a silazane compound and a siloxane compound are employable. The average diameter of the primary particles of the fine particles is preferably from 5 to 50 nm, and more preferably from 7 to 16 nm, since the fine particles with large average diameter displays high matting effect-and those with small average diameter is superior in the transparency. It is preferable that the fine particles are usually aggregated particles in the cellulose ester film and form a roughness of from 0.01 to 1.0 μm on the surface of the cellulose ester film. As the fine particles of silicon dioxide, Aerosil 200, 200V, 300, R972, R974, R202, R812, OX50 and TT600 can be cited and Aerosil 200V, R972, R972V, R974, R202 and R812 are preferred. These fine particles may be employed in combination of two or more kinds thereof. When the two or more kinds of the particles are employed in combination, they can be mixed in an optional ratio. In such the case, two or more kinds of the particle each different from each other in the average diameter or the material, for example, Aerosil 200V and 972 can be employed within the range of from 0.1:99.9 to 99.9:0.1. In the invention, it is preferable that the fine particles are dispersed to form dispersion separately from the cellulose ester solution and then employed for preparation of the dope even though the fine particles may be dispersed together with the cellulose ester, another additive and the organic solvent on the occasion of the dope preparation. For dispersing the fine particles, it is preferable that the fine particles are previously immersed in the organic solvent and finely dispersed by a dispersing machine giving high shearing force (a high pressure dispersing machine). After that, the dispersion is preferably further dispersed in a large amount of the organic solvent and mixed with the cellulose ester solution by an inline mixer to form the dope. In such the case, the UV absorbent may be added to the fine particle dispersion liquid to form a UV absorbent liquid.

The foregoing degradation preventing agent, UV absorbent and/or the fine particles may be added together with the cellulose ester and the organic solvent on the occasion of the preparation of the cellulose ester solution preparation, or in the course or after the preparation of the solution.

Any organic solvent may be employed without any limitation as long as it can dissolve the cellulose ester, the compound having at least two aromatic rings which have the planar structure and another additive at the same time. For example, a chloride type organic solvent such as methylene chloride and a none-chloride type organic solvent such as methyl acetate, ethyl acetate, acetone, tetrahydrofuran, 1,3-dioxolane, 1,4-dioxolane, cyclohexanone, ethyl formate, 2,2,3-trifluoromethanol, 2,2, 3,3-hexafluoro-1-propanol, 1.3-difluoro-2-propanol, 1,1,1,3,3,3-hexafluoro-2-methyl-2-Propanol, 1,1,1,3,3,3-hexafluoro-2-propanol, 2,2,3,3,3-pentafluoro-1-propanol and nitroethane are employable, and methylene chloride, methyl acetate, ethyl acetate and acetone are preferable.

In the dope relating to the invention, 1 to 40% by weight of an alcohol having 1 to 4 carbon atoms is preferably contained. When the content of the alcohol in the dope is increased, the web is gelled and easily peeled off from the metal support, and the alcohol accelerates the dissolution of the cellulose ester in the organic solvent when the content is low. Examples of the alcohol having 1 to 4 carbon atoms include methanol, ethanol, n-propanol, iso-propanol, n-butanol, sec-butanol and tert-butanol. Among them, ethanol is preferred since which shows high stability of the dope, relatively low boiling point, high drying rate and low poisonous property.

A concentration of the cellulose ester in the dope of from 15 to 40% by weight and a viscosity of the dope of from 100 to 500 poise are preferable for obtaining high quality of the film surface.

A plasticizer can be added to the dope relating to the invention. As the plasticizer, a phosphate type plasticizer, a phthalate type plasticizer, a glycolate type plasticizer and a citrate type plasticizer are preferably employed. The phosphate type plasticizer such as triphenyl phosphate, tricresyl phosphate, cresylphenyl phosphate, octyldiphenyl phosphate, diphenylbiphenyl phosphate, trioctyl phosphate and tributyl phosphate; the phthalate type plasticizer such as diethyl phthalate, dimethoxyethyl phthalate, dioctyl phthalate, dibutyl phthalate, di-2-ethylhexyl phthalate, butylbenzyl phthalate and dibenzyl phthalate; the citrate type plasticizer such as acetyltriethyl citrate and acetyltributyl citrate; the glycolate type plasticizer such as an alkylphthalylalkyl glycolate; and another plasticizer such as butyl oleate, methylacetyl ricinolate, dibutyl sebacylate are cited. In the invention, the glycolate type plasticizers are preferably employed and the alkyl group in the alkylphthalylalkyl glycolate is preferably one having 1 to 8 carbon atoms. Examples of the preferable glycolate type plasticizer include methylphthalylmethyl glycolate, ethylphthalylethyl glycolate, propylphthalylpropyl glycolate, propylphthalylpropyl glycolate, butylphthalylbutyl glycolate, octylphthlayloctyl glycolate, methylphthalylethyl glycolate, ethylphthalylmethyl glycolate, ethylphthlaylpropyl glycolate, propylphthalylethyl glycolate, methylphthalylpropyl glycolate, methylphthalylbutyl glycolate, ethylphthalylbutyl glycolate, butylphthalylmethyl glycolate, butylphthalylethyl glycolate, butylphthalylpropyl glycolate, methylphthalyloctyl glycolate, ethylphthalyloctyl glycolate, octylphthalylmethyl glycolate and octylphthalylethyl glycolate, and methylphthalylmethyl glycolate, ethylphthalylethyl glycolate, propylphthalylpropyl glycolate, butylphthalylbutyl glycolate and octylphthalyloctyl glycolate are preferable, and ethylphthalylethyl glycolate is particularly preferred. These alkylphthalylalkyl glycolates may be employed in a mixture of two or more kinds of them. The adding amount of the alkylphthalylalkyl is preferably from 1 to 10% by weight of the cellulose ester from the view point of reducing the contact force and prevention of the bleed out from the film. In the invention, the alkylphthalylalkyl may be mixed with another plasticizer above described.

[Cycloolefin Polymer Film]

The cycloolefin polymer usable in the invention is a polymer resin containing an aliphatic ring structure.

Preferable cycloolefin polymer is a resin formed by polymerization or copolymerization of a cyclic olefin. Examples of the cyclic olefin include a multi-ring structure unsaturated hydrocarbon and its derivative such as norbornene, dicyclopentadiene, tetracyclododecene, ethyltetracyclododecene, ethylydenetetracyclododecene and tetracyclo[7.4.0.110,13.02.7]trideca-2,4,6,11-tetraene; and a single ring structure unsaturated hydrocarbon and its derivative such as cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene, cycloheptene, cycldpentadiene and cyclohexadiene. These cyclic olefins each may have a polar group as-the substituent. Examples of the polar group include a hydroxyl group, a carboxyl group, an alkoxyl group, an epoxy group, a glycidyl group, an oxycarbonyl group, a carbonyl group, an amino group, an ester group, and an anhydrous carboxylic acid group, and the ester group, carboxyl group and anhydrous carboxylic acid group are particularly preferable.

Preferable sycloolefin polymers may be one additionally copolymerized with a monomer other than the cyclic olefin. The monomer capable of additionally copolymerizing with the cyclic olefin is, for example, an ethylene or α-olefin such as ethylene, propylene, 1-butene and 1-pentene or a diene compound such as 1,4-hexadiene, 4-methyl-1,4-hexadiene, 5-methyl-1,4-hexadiene and 1,7-octadiene.

The cyclic olefin is obtained by additional polymerization reaction or ring opening metathesis. The polymerization is performed in the presence of a catalyst. For example, a polymerization catalyst composed of a vanadium compound and an organic aluminum compound is employable as the additional polymerization catalyst. As the catalyst for the ring opening metathesis reaction, a polymerization catalyst composed of a halide, nitrate or acetylacetone compound of a metal such as ruthenium, rhodium, palladium, osmium, iridium and platinum and a reducing agent; or a polymerization catalyst composed of halide or acetylacetone compound of a metal such as titanium, vanadium, zirconium, tungsten and molybdenum and an organic aluminum compound are employable. The temperature and pressure for the polymerization are usually a temperature of from −50° C. to 100° C. and a pressure of from 0 to 490 N/cm$^2$, even though they are not specifically limited.

The sycloolefin polymer to be used in the invention is preferably one in which the unsaturated bonds are converted to saturated bonds by hydrogenation. The hydrogenation reaction is performed by blowing hydrogen in the presence of a hydrogenation catalyst. As the hydrogenation catalyst, a uniform type catalyst composed of combination of a transition metal compound/an alkyl metal compound such as cobalt acetate/triethyl aluminum, nickel acetylacetonate/triiso-butyl aluminum, titanosendi chloride/n-butyl lithium, zirconosendi chloride/sec-butyl sodium and tetrabutoxytitanate/dimethyl magnesium; and a non-uniform solid carrier catalyst composed of a metal catalyst and a carrier such as nickel/silica, nickel/diatomaceous earth, nickel/alumina, palladium/carbon, palladium/silica, palladium/diatomaceous earth and palladium/alumina are employable. Furthermore, the following norbornene type polymer can be cited as the cycloolefin polymer. The norbornene polymer is preferably one having a norbornene skeleton as the repeating unit. As the concrete examples, ones described in Japanese Patent Tokkai Sho 62-252460 and 62-252407, Hei 2-133413, Sho 63-145324 and 63-264626, Hei 1-240517, Tkko Sho 57-8815, Tokkai Hei 5-39403, 5-43663, 5-43834, 5-70655, 5-279554, 6-206985, 7-62028, 8-176411 and 9-291484 are preferably employed, but the norbornene polymer is not limited to the above. This polymer may be used singly or in combination of two or more kids of them.

In the invention, ones having the repeating unit represented by the following structural formulas of 1 through IV are preferable.

(I)

(II)

-continued

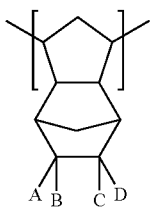
(III)

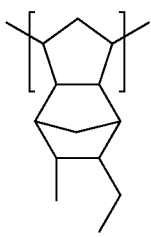
(IV)

In Formula I to IV, A, B, C and D are each independently a hydrogen atom or a mono-valent organic group.

Among the foregoing norbornene type polymer, a hydrogenated polymer obtained by hydrogenation of a polymer synthesized by metathesis polymerization of at least one compound represented by the following Formula V or VI and an unsaturated cyclic compound capable of polymerizing with the compound is also preferable.

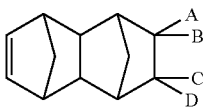
(V)

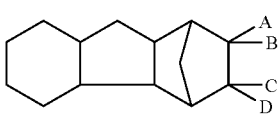
(VI)

In Formula I to IV, A, B, C and D are each independently a hydrogen atom or a mono-valent organic group.

Though the above A, B, C and D are not specifically limited, they are preferably a hydrogen atom, a halogen atom or a mono-valent organic group, and the organic groups may be bonded through at least two linking groups, these groups may be the same with or different from each other. A or B and C or D may be form a single or multi ring structure. The above-described at least two linking groups include a hetero atom such as an oxygen atom, a sulfur atom and a nitrogen atom, for example, an ether group, an ester group, a carbonyl group, a urethane group, an amido group and a thioether group are cited, but the group is not limited to the above-mentioned. The organic group may be further substituted through such the linking group.

As another monomer capable of polymerizing with the norbornene type monomer, an α-olefin having 2 to 20 carbon atoms and its derivative such as ethylene, propylene, 1-butene, 1-pentene, 1-hexene, 1-octene, 1-decene, 1-dodecene, 1-tetradecene, 1-octadecene and eicocene; a cycloolefin and its derivative such as cyclobutene, cyclopentene, cyclohexane, cyclooctene and 3a,5,6,7a-tetrahydro-4,7-methano-1H-indene; and a non-conjugated diene such as 1,4-hexadiene, 4-methyl-1,4-hexadiene, 5-methyl-1,4-hexadiene and 1,7-octadiene are employed, among them the α-olefin particularly ethylene is preferable.

These the other monomers copolymerizable with the norbornene type monomer can be employed singly or in combination of two ore more kinds thereof. When the norbornene type monomer and the other monomer copolymerizable with the norbornene type monomer are additionally copolymerized, the ratio of the structural unit derived from the norbornene type monomer and that derived from the other copolymerizable monomer in the additional copolymer is optionally selected so as to be usually from 30:70 to 99:1, preferably from 50:50 to 97:3, more preferably from 70:30 to 95:5.

When unsaturated bonds remaining in the molecular chain or the synthesized polymers is saturated by hydrogenation, the hydrogenating ratio is made to not less than 90%, preferably not less than 95%, and further preferably not less than 99% from the view point of anti-light degradation and anti-seasoning property.

Furthermore, the cycloolefin polymer employable in the invention include a thermoplastic saturated norbornene type resin described in Paragraphs [0014] through [0019] of Tokkai Hei 5-2108, a thermoplastic norbornene type polymer described in Paragraphs [0015] through [0031] of Tokkai 2001-277430, a thermoplastic norbornene type resin described in Paragraphs [0008] through [0045] of Tokkai 2003-14901, a norbornene type resin composition described in Paragraphs [0014] through [0028] of Tokkai 2003-139950, a norbornene type resin described in Paragraphs [0029] through [0037] of Tokkai 2003-161832, a norbornene type resin described in Paragraphs [0027] through [0036] of Tokkai 2003-195268, an aliphatic cyclic structure-containing polymer resin described in Paragraphs [0009] through [0023] of Tokkai 2003-211589 and a norbornene type polymer resin and a vinyl aliphatic cyclic hydrocarbon polymer resin described in Paragraphs [0008] to [0024] of Tokkai 2003-211588.

Though the molecular weight of the cycloolefin polymer to be employed in the invention is selected according to the purpose of the use, usually from 5,000 to 500,000, preferably from 8,000 to 200,000, and more preferably from 10,000 to 100,000, in the weight average molecular weight in terms of polyisoprene or polystyrene measured by gel permeation chromatography of a cyclohexane solution (a toluene solution when the polymer resin is not dissolved), since the mechanical strength and the suitability for forming process are highly balanced when the molecular weight is within the above range.

The decomposition and the coloring of the polymer on the occasion of the forming processing can be effectively prevented by adding an amount of from 0.01 to 5 parts by weight of a low voltaic anti-oxidant to 100 parts by weight of the cycloolefin polymer.

The antioxidant having a vapor pressure at 20° C. of from not more than $10^{-5}$ Pa, and particularly preferably not more than $10^{-8}$, is preferred. An antioxidant having a vapor pressure of higher than $10^{-5}$ Pa causes problems of bubble formation at the time of forming by extrusion and evaporation from the surface of the product when the product is exposed to high temperature.

Examples of the antioxidant usable in the invention are listed below, one or a combination of plural of them may be employed.

Hindered phenol type: 2,6-di-butyl-4-methylphenol, 2,6-di-t-butylphenol, 4-hydroxymethyl-2,6-di-t-butylphenol, 2,6-di-butyl-α-methoxy-p-dimethylphenol, 2,4-di-t-amylphenol, t-butyl-m-cresol, 4-t-butylphenol, styrenized phenol, 3-t-butyl-4-hydroxyanisol, 2,4-dimethl-6-t-butylphenol, octadecyl-3-(3,5-di-t-butyl-4-hydroxyphenyl) propionate, 3,5-di-t-butyl-4-hydroxybenzylphosphonate diethyl ester, 4,4'-bisphenol, 4,4'-bis-(2,6-di-t-butylphenol), 2,2'-methylene-bis-(4-methyl-6-t-butylphenol), 2,2'-methylene-bis-(4-methyl-6-α-methylcyclohexylphenol), 4,4'-methylene-bis-(2-methyl-6-t-butylphenol), 4,4'-methylene-bis-(2,6-di-t-butylphenol), 1,1'-methylene-bis-(2,6-di-t-butylnaphthol), 4,4'-butylidene-bis-(2,6-di-t-buthyl-meta-cresol), 2,2'-thio-bis-(4-methyl-6-t-butylphenol), di-o-cresol sulfide, 2,2'-thio-bis-(2-methyl-6-t-butylphenol), 4,4'-thio-bis-(3-methyl-6-t-butylphenol), 4,4'-thio-bis-(2,3-di-sec-amylphenol), 1,1'-thio-bis-(2-naphthol), 3,5-di-t-butyl-4-hydroxybenzyl ether, 1,6-hexanediol-bis-[3-(3,5-di-t-butyl-4-hydroxyphenyl)propionate], 2,4-bis-(n-octyl)-6-(4-hydroxy-3,5-di-t-butylanilino)-1,3,5-triazine, 2,2-thiodiethylene-bis-[3-(3,5-di-t-butyl-4-hydroxyphenyl)-propionate], 2,2-thiobis(4-methyl-6-t-butylphenol), N,N'-hexamethylene-bis(3,5-di-t-butyl-4-hydroxy-hydrocinnamine), bis(ethyl 3,5-di-t-butyl-4-hydroxybenzylsulfonate)calcium, 1,3,5-trimethyl-2,4,6-tris-(3,5-di-t-butyl-4-hydroxbenzyl)benzene, triethylene glycol-bis[3-(3-t-butyl-5-methyl-4-hydroxyphenyl)-propionate], 1,3,5-trimethyl-2,4,6-tris-(3,5-di-t-butyl-4-hydroxybenzyl) benzene, tris-(3,5-di-t-butyl-4-hydroxybenzyl)-isocyanulate and pentaerythrityl-tetrakis-[3-(3,5-di-t-butyl-4-hydroxydienyl)propionate]

Aminophenol type: n-butyl-p-aminophenol, n-butyloyl-p-aminophenol, n-pelagonoly-p-aminophenol, n-lauroyl-p-aminophenol, n-stearoyl-p-aminophenol, 2,6-di-t-butyl-α-dimethylamino-p-cresol Hydroquinone type: hydroquinone, 2,5-di-t-butylhydroquinone, 2,5-di-t-amylhydroquinone, hydroquinone methyl ether and hydroquinone mono benzyl ether Phosphite type: triphosphite, tris(3,4-di-t-butylphenyl) phosphite, tris(nonylphenyl)phosphite, tetrakis(2,4-di-t-butylphenyl)-4,4'-biphenylenephosphinate and 2-ethylhexyloctylphosphite Others: zinc salt of 2-mercaptobenzothiazole, di-o-tolylguanidine salt of dicathecol borate, nickel-dimethyl-ditiocarbamate, nickel-pentamethylene-dithiocarbamate, mercaptobenzimidazole and zinc salt of 2-mercaptobenzimidazole A usual additive capable of being added to plastic film may be contained in the cycloolefin polymer film. Such the additive-includes a thermal stabilizing agent, a light proof stabilizing agent, a UV absorbent, an anti-static agent, a lubricant, a plasticizer and a filler. The content of them may be selected within the range in which the object of the invention is not impeded.

<Molted Casting Method>

There is no limitation on the forming method of the cycloolefin film, and both of a heat-melting film forming method and a solution casting method are applicable. The heat-melting film forming method can be further classified into an extrusion forming method, a press forming method, an inflation forming method, an injection forming method, a blow forming method and stretching forming method, among them the extrusion forming method, inflation forming method and press forming method are preferable and the extrusion forming method is most preferable. In the case of the extrusion forming method, the cylinder temperature is set usually at a temperature of from 150 to 400° C., preferably from 200 to 350° C., and more preferably 230 to 330° C., even though the forming conditions are optionally decided according to the purpose of the use and the forming method. When the resin temperature is excessive low, the fluidity of the resin is lowered so as to result sink mark or distortion in the film and when the resin temperature is excessively high, possibility of occurrence of defects of the film such as voids, silver streaks and yellow coloration caused by decomposition of the resin is posed. The thickness of the film is usually from 5 to 300 µm, preferably from 10 to 200 µm, and more preferably from 20 to 100 µm. When the thickness is excessively small, the handling on the occasion of the lamination and when the thickness is too large, the drying time after the lamination is made to long so as to lower the production efficiency.

The cycloolefin polymer film preferably has a surface wetting tension of not less than 40 mN/m, more preferably not less than 50 mN/m, and further preferably not less than 55 mN/m. The adhesive strength of the film with the polarizing plate is raised when the surface wetting tension is within the above range. For controlling the surface wetting tension, for example, a corona discharging treatment, ozone blowing, UV-irradiation, chemical agent treatment and another know surface treatment can be applied.

A thickness of from about 50 to about 500 µm is necessary for the sheet before the stretching. The unevenness of the thickness is preferably as small as possible, and preferably within ±8%, preferably within ±6%, and more preferably within ±4%.

To make the cycloolefin polymer film to the optical compensation film according to the invention, it is necessary to stretch the sheet in at least one axis direction the same as in the cellulose ester film. The stretching may be two-axis stretching substantially being one-axis stretching, for example, in which the sheet is once stretched within a degree of not influencing on the orientation of the molecules and then stretched in one-axis direction for orienting the molecules. Besides, it is allowed that the film is stretched in a certain direction and then further stretched in the direction making a right angle with the firstly stretched direction for giving retardation in the face and the thickness direction. For stretching, the foregoing tenter apparatus is preferably employed.

The stretching magnification is made from 1.3 to 10 times, and preferably from 1.5 to 8 times so-as to obtain the desired retardation. When the stretching magnification is too low, the absolute value of the retardation is not raised to the designated value and when the magnification is too high, the film is broken sometimes.

The stretching is usually performed at a temperature within the range of from Tg −20° C. to Tg +50° C., preferably from Tg −15° C. to Tg +40° C.; Tg is the glass transition point of the resin constituting the sheet. When the temperature is too low, the film is broken and when the temperature is too high, the molecules are not oriented so that the desired retarding film cannot be obtained.

Thus obtained film has the retardation within the range of the invention by orientation of the molecules. The retardation can be controlled by the retardation of the sheet before the stretching, the stretching magnification, the stretching temperature and the thickness of the film orientated by stretching. In the film having a certain thickness, the film shows a tendency that the absolute value of retardation becomes larger accompanied with increasing of the stretching magnification. Accordingly, the film oriented by stretching having desired retardation can be obtained by varying the stretching magnification.

The scattering of the retardation is preferably smaller. The scattering of the retardation at 589 nm of the film oriented by stretching is as small as usually within 50 nm, preferably within +30 nm, and more preferably within ±15 nm, and further preferably within ±10 nm.

The scattering of the retardation in the film face or the unevenness in the thickness can be made smaller by the use of the sheet small in such the scattering and unevenness and making uniform by the stress applying the sheet on the occasion of the stretching. For such the purpose, the stretching is preferably performed under a condition of uniform temperature distribution controlled so as preferably to be within ±5° C., more preferably ±2° C., particularly preferably ±0.5° C.

<<Polarizing Plate and Liquid Crystal Displaying Apparatus>>

The film according to the invention can be employed as the optical compensation film for expanding the viewable angle of the liquid crystal displaying apparatus and the protective film for the polarizing plated with the stable properties since the film holds suitable retardation, slow axis property and the fast axis property.

The polarizing plate relating to the invention is described below.

The polarizing plate relating to the invention can be produced by a usual method. For example, a method is applied, in which the optical compensation film of the invention is subjected to an alkali saponifying treatment and then laminated by an aqueous solution of completely saponified poly(vinyl alcohol) onto both surfaces a polarizing layer which is prepared by immersing an stretching a film in an iodine solution. The alkali saponifying treatment is a treatment by immersing the film in a strong alkaline liquid for improving the wetting ability with the aqueous adhesive and the adhesion ability of the film.

In the polarization plate relating to the invention, it is preferable that the polarization layer and the optical compensation film are laminated so that the light permeable axis of the polarizer containing a dichromic substance and the widthwise stretched direction on the occasion of the casting of the optical compensation film is made approximately parallel. In the invention, "crossing with a right angle" means that the axes are crossed with approximately with a right angel and "the directions are consistent" means that the directions of the axes are approximately in parallel.

As the polarizer to be employed in the polarizing plate, usually known ones are employable. For example, a film of a hydrophilic polymer such as poly(vinyl alcohol) which is treated by a dichromic dye such as iodine and stretched or a plastic film such as poly(vinyl chloride) which is treated so as to be oriented is employed. Thus obtained polarizer is low in the durability and degraded during the use for a long period. Therefore, a film such as a cellulose acetate film (polarizing plate protective film) is laminated on both sides of the polarizer.

In such the case, the optical compensation film according to the invention is employed as at least one of the. polarizer protective film sheets. Another film may be employed on the other side. For example, the, film of the invention prepared for the optical compensation film or a cellulose ester film available on the-market such as KC8UX2MW, KC4UX2MW and KC5UN, manufactured by Konica-Minolta Opt Co., Ltd., and a cycloolefin film such as Zeonex manufactured by Zeon Co., Ltd., Arton manufactured by JSR Co., Ltd., and Apel (APL8008T, APL6509T, PAL6013T, APL5014DP, and APL6015T) can be employed as the polarizing palate protective film on the other side of the plate. The polarizing protective film on the surface side of the displaying apparatus preferably has an anti-reflection layer, anti-static layer and ant-dirtying layer additionally to the anti-glaring or a clear hard coating layer. The anti-reflection layer such as a silicon oxide layer and a titanium oxide layer, anti-static layer and ant-dirtying layer can be preferably provided by a method such as coating, spattering, CVD, ordinary pressure plasma CVD and vacuum evaporation.

Various displaying apparatus of the invention excellent in the visibility can be prepared by building in the polarizing plate according-to the invention into the displaying apparatus. The optical compensation film according to the invention is preferably employed in a LCD by various driving system such as a reflection type, a transmission type, a semi-transmission type, an NT type, an STN type, an OCB type, HAN type, a VA (PVA, MVA) type and an IPS type. The optical compensation film according to the invention is excellent in the flatness and preferably employed also in various displaying apparatus such as a plasma display, a field emission display, an organic EL display, an inorganic EL display and an electronic paper. Particularly, in a large displaying apparatus such as 30 type or more, particularly form 30 to 54 type, white lacking at the circumference portion of the image dose not occur and such the effect is maintained for a long period, and remarkable effects are recognized in a VA type liquid crystal displaying apparatus. Unevenness in color, roughness and wavy unevenness are not in the image and an effect that eye is not tired by watching for a long time is obtained.

EXAMPLES

The invention is described below referring examples, but the invention is not limited to the examples.

Example 1

(Measuring Method of Ro, Rt and Slow Axis Direction)

The average refractive index of the film constitution material was measured by an Abbe's refractometer (4T). The thickness of the film was measured by a micrometer.

The retardation of the film at a wavelength of 590 nm was measured by an automatic double refractometer KOBRA-21ADH, manufactured by Oji Keisokuki Co., Ltd. The film was stood for 24 hours under an atmosphere of 23° C. and 55% RH before the measurement. The retardation in the film face Ro and the retardation in the thickness direction Rt were calculated by inputting the average refractive index and the film thickness. The direction of the slow axis was measured at the same time to determine the orientation angle.

Variation of Orientation Angle in Length Direction

The variation of the orientation angle in the length direction was measured by taking samples in an interval of 15 cm at the position of 30 cm from the edge in the width direction and measuring by the double refractometer KOBRA-21ADH, manufactured by Oji Keisokukiki Co., Ltd. It is necessary that the cutting face or the standard line of the sample is exactly consistent with the length direction of the film, therefore, the sample has to be precisely set in the folder.

<<Preparation of Optical Compensation Film>>
<Preparation of the Cellulose Ester Film 101: Inventive>
<Fine Particle Dispersion>

| | |
|---|---|
| Fine particle Aerosil R972 (Nihon Aerosil Co., Ltd.) | 11 parts by weight |
| Ethanol | 89 parts by weight |

The above-mentioned was mixed and stirred for 50 minutes by a dissolver and dispersed by Manton-Gaulin Dispersing machine.

<Fine Particle-added Liquid>

In a dissolving tank, the following cellulose ester was put and completely dissolved by heating, and the filtered by Azumi Filter Paper No. 24, manufactured by Azumi Roshi Co., Ltd. To the filtered cellulose ester solution, the fine particle dispersion was slowly added while sufficiently stirring. After that, the mixture was dispersed by an attriter and then filtered by Finemet NF, manufactured by Nihon Seisen Co., Ltd., to prepare a fine particle-added liquid.

| | |
|---|---|
| Methylene chloride | 99 parts by weight |
| Cellulose ester (Acetyl group substitution degree: 2.08, propionyl group substitution degree: 0.8, Mn = 110,000, Mw/Mn = 1.9) | 4 parts by weight |
| Fine particle dispersion | 11 parts by weight |

A principal dope having the following composition was prepared. Methylene chloride and ethanol was charged in a pressure dissolving tank. The following cellulose ester was put into the pressure dissolving tank containing the solvent. The mixture was completely dissolved by heating and stirring, and then the plasticizers and the UV absorbents were added and dissolved. Thus obtained solution was filtered by Azumi Filter Paper No. 244, manufactured by Azumi Roshi Co., Ltd., to prepare the principal dope. The fine particle-added liquid was added to 100 parts by weight of the principal dope so that the content of the fine particle-added liquid becomes to 2 parts by weight and sufficiently mixed by an inline mixer (a static in-pipe mixer Hi-Mixer, SWJ, manufactured by Toray Co., Ltd.) and then uniformly cast on a stainless steel endless band support with a width of 2 m by the belt casting apparatus of the film casting equipment shown in FIG. 7. The solvent was evaporated on the stainless steel band until the remaining solvent content become to 110%, and then the film was peeled off from the stainless steel band support. The peeled film was dried in the first dying zone 6 while stretching in the length direction by applying tension on the occasion of the peeling so that the length (MD) stretching magnification is to be 1.0. After that the both edges of the web are clipped in the tenter portion and stretched under a condition of the remaining solvent content of 20% and a temperature of 130° C. so that the width stretching ratio of to be 1.3. On this occasion, the balances of the temperature and the lowing air amount at the right side and the left side of the tenter apparatus are controlled and the interval and the tension of the clips adjusted so that the maximum value of the orientation angle of the slow axis in the film face with the width direction of the film was +0.4° and the minimum value of that was −0.4°, the orientation angle of the slow axis in the film face with the length direction was within ±0.4°, the variation cycle of the orientation angle was 115 m and the minimum amplitude of the cycle was 0.3°. After the stretching, the film was still maintained in the width thereof for several seconds to alleviate the tension in the width direction and then the film was released from the clips. Thereafter, the film was further dried for 30 minutes at 125° C. while conveying in the second drying zone 9. Thus cellulose ester Film 101 was prepared which has a width of 1.5 m, a length of 3,000 m, a thickness of 80 μm and knurling having a width of 1 cm and a height of 8 μm.

<Composition of Principal Dope>

| | |
|---|---|
| Methylene chloride | 300 parts by weight |
| Ethanol | 52 parts by weight |
| Cellulose ester (acetyl group substitution degree: 2.08, propionyl group substitution degree: 0.8, Mn = 110,000, Mw/Mn = 1.9) | 100 parts by weight |
| Triphenyl phosphate | 9.5 parts by weight |
| Ethyphthalyl glycolate | 2.2 parts by weight |
| Tinuvin 109 (Ciba Specialty Chemicals Co., Ltd.) | 1.3 parts by weight |
| Tinuvin 171 (Ciba Specialty Chemicals Co., Ltd.) | 0.6 parts by weight |

Figure 2:
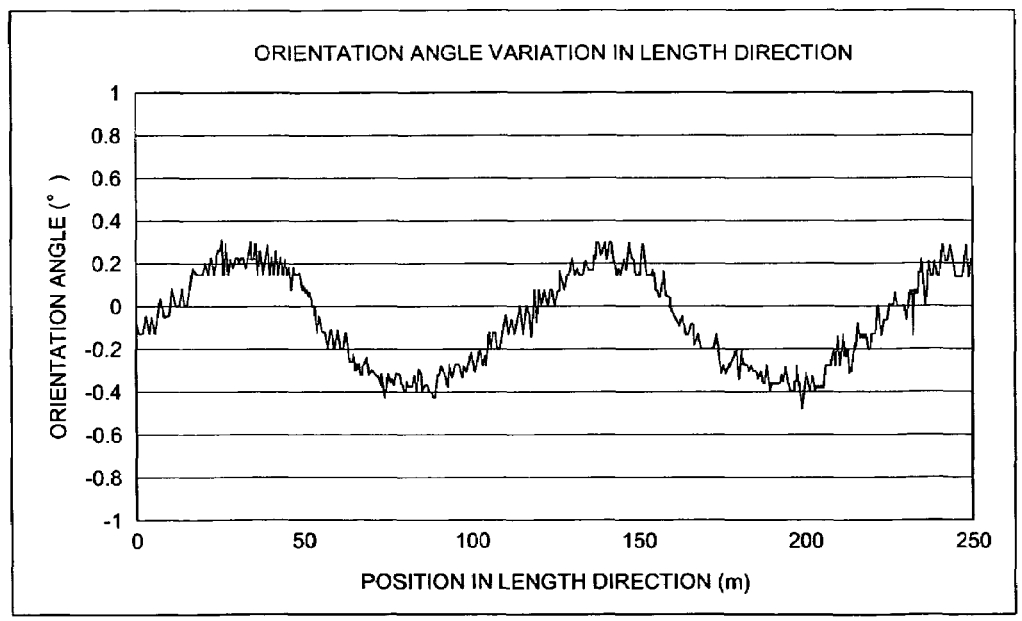
FIG. 2 shows the variation of the orientation angle in the length direction of Cellulose Ester Film 101.
Figure 11:
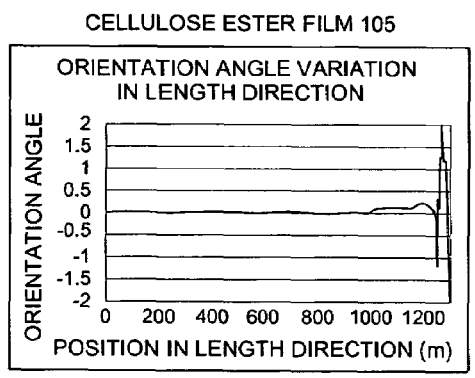
FIG. 11 shows the variation of orientation angle in the width direction of the film in the effective width of the film roll.

The variation in the orientation angle in the length direction of thus obtained Cellulose Ester Film 101 is displayed in FIG. 2 and the variation of the orientation angle in the width direction is displayed in FIG. 11.

<Preparation of Cellulose Ester Film 102: Inventive>

Cellulose Ester Film 102 having the maximum value of the orientation angle of the slow axis in the film face with the width direction of the film of +0.7° and the minimum value of that of −0.7°, the maximum value of the orientation angle of the slow axis in the film face with the length direction of +0.7° and the minimum value of that of −0.7°, the variation cycle of the orientation angle of 320 m and the minimum amplitude of the cycle of 0.7° was prepared in the same manner as in Cellulose Ester Film 101 except that the length of the tenter apparatus, the interval of clips and the tension of the clips were controlled.

Figure 3:
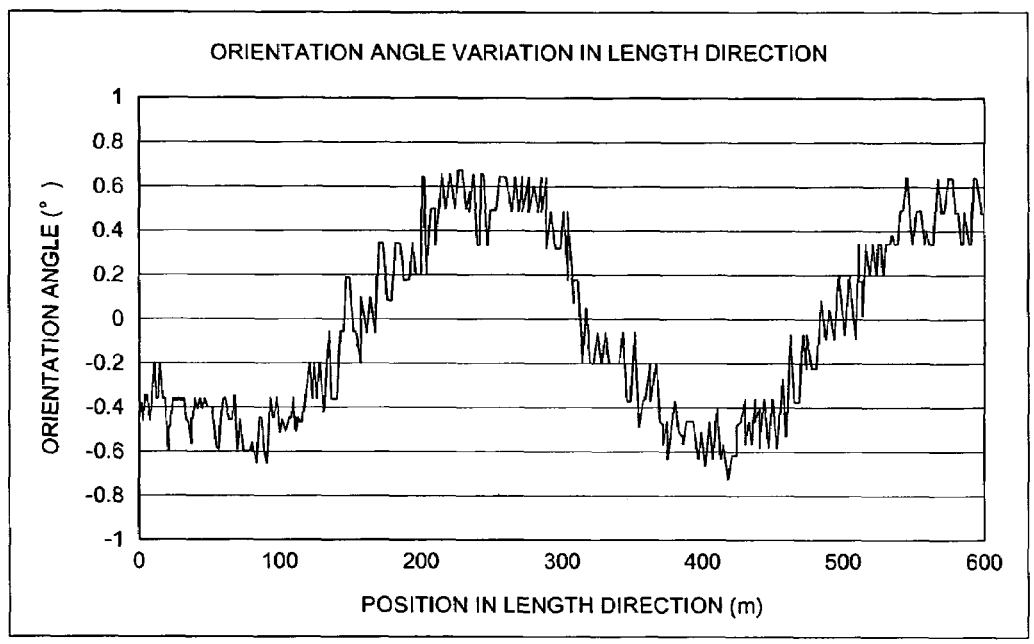
FIG. 3 shows the variation of the orientation angle in the length direction of Cellulose Ester Film 102.

The orientation variation in the length direction of Cellulose Ester Film 102 is displayed in FIG. 3.

<Preparation of Cellulose Ester Film 103: Inventive>

Cellulose Ester Film 103 having the maximum value of the orientation angle with the width direction of the film of 45.3° and the minimum value of that of 44.7°, the maximum value of the orientation angle of the slow axis in the film face with the length direction of the film of 45.3° and the minimum value of that of 44.7°, the variation cycle of the orientation angle of 140 m and the minimum amplitude of the cycle of 0.3° was prepared in the same manner as in Cellulose Ester Film 101 except that the stretching was performed in the tenter portion 8 at a stretching temperature of 155° C. in a stretching magnitude of 1.30 in a direction of 45° with the width direction, and on the occasion of that the length of the tenter apparatus, the interval of clips and the tension of the clips were controlled.

Figure 4:
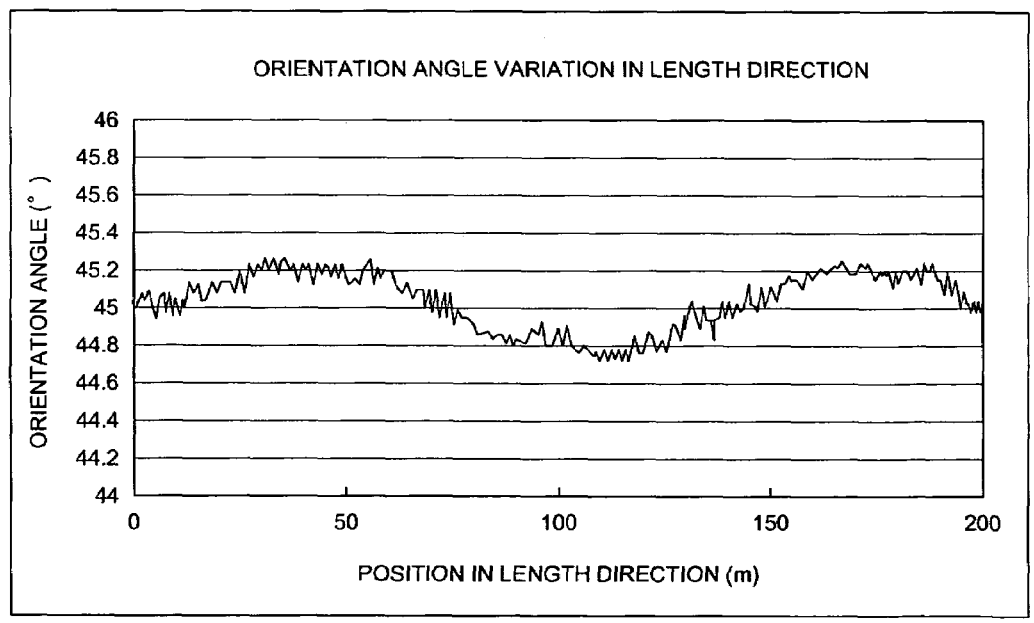
FIG. 4 shows the variation of the orientation angle in the length direction of Cellulose Ester Film 103.

The orientation variation in the length direction of Cellulose Ester Film 103 is displayed in FIG. 4.

<Preparation of Cellulose Ester Film 104: Comparative>

Cellulose Ester Film 104 having the maximum value of the orientation angle of the slow axis in the film face with the width direction of the film of +1.4° and the minimum value of that of −1.4°, the maximum value of the orientation angle of the slow axis in the film face with the length direction of within +1.4° and the minimum value of that of −1.4°, the variation cycle of the orientation angle of 120 m and the minimum amplitude of the cycle of 1.4° was prepared in the same manner as in Cellulose Ester Film 101 except that the length of the tenter apparatus, the interval of clips and the tension of the clips were controlled.

Figure 5:
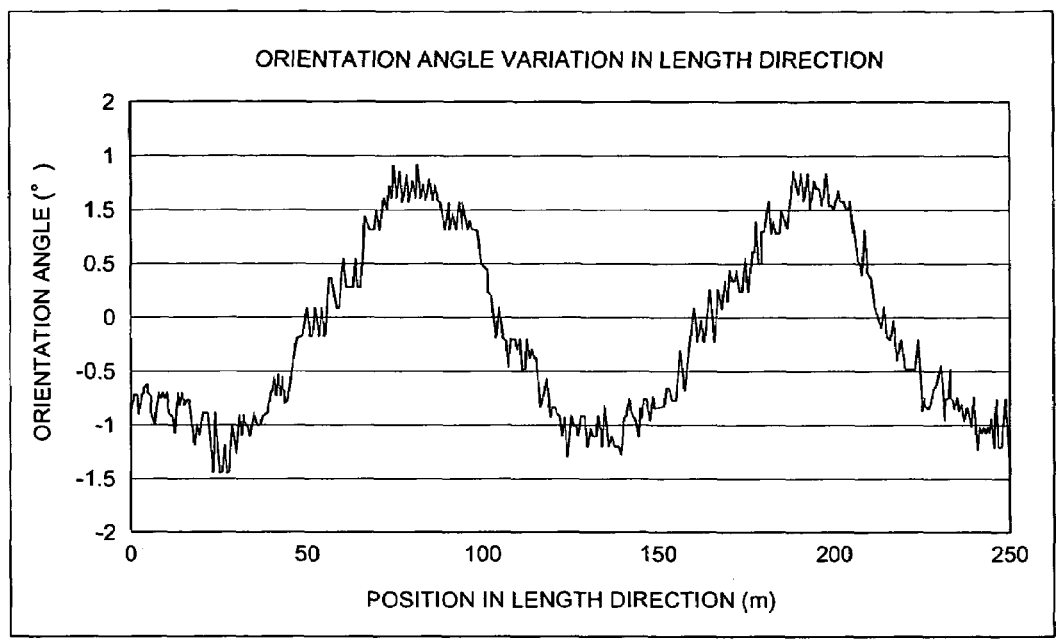
FIG. 5 shows the variation of the orientation angle in the length direction of Cellulose Ester Film 104.

The orientation variation in the length direction of Cellulose Ester Film 104 is displayed in FIG. 5.

<Preparation of Cellulose Ester Film 105: Comparative>

Cellulose Ester Film 105 having the maximum value of the orientation angle of +0.04° and the minimum value of that of −0.04°, the maximum value of the fast axis in the film face of film of +0.04° and the minimum value of −0.04° and a cycle of 103 m was prepared in the same manner as in Cellulose Ester Film 101 except that the timing of feedback of set at a frequency of 0.05 seconds and the blowing air amount in the drying process of increased by 5 times. However, the temperature control can not be followed when the film formation exceeded about 1,000 m and hunting of the air blowing amount and the temperature become large when the produced length of the film of over 1,100 m and the deviation of the orientation angle exceeded 3° in approximately 1,100 ore more of the film (the variation of the orientation angle is displayed in FIG. 11). Moreover, the retardation in the film face is varied 20 nm or more after production of 1,000 m of the film.

<Preparation of Cellulose Ester Film 106>

Cellulose Ester Film 106 having the maximum value of the orientation angle of the slow axis of the face of the film with the width direction of the film of +0.7° and the minimum value of that of −0.7°, the maximum value of the orientation angle of the fast angle in the surface of the film with the length direction of the film of +0.7° and the minimum value of that of −0.7°, and the variation cycle of the orientation angle of 2 m was prepared in the same manner as in Cellulose Ester Film 101 except that the feedback interval of set at 1.5 seconds and the intervals of the clips of right and left of the tenter were controlled.

<Preparation of Cellulose Ester Film 107>

Cellulose Ester Film 107 having the maximum value of the orientation angle of the slow axis of the film face with the width direction of the film of +0.7° and the minimum value of that of −0.7°, the maximum value of the orientation angle of the fast angle in the surface of the film with the length direction of the film of +0.7° and the minimum value of that of −0.7°, and the variation cycle of the orientation angle of 5 m was prepared in the same manner as in Cellulose Ester Film 101 except that the feedback interval of set at 3.5 seconds and the positions of the right and left clip closers were controlled.

<Preparation of Cellulose Ester Film 108>

Cellulose Ester Film 108 having the maximum value of the orientation angle of the slow axis of the film face with the width direction of the film of +0.7° and the minimum value of that of −0.7°, the maximum value of the orientation angle of the fast angle in the surface of the film with the length direction of the film of +0.7° and the minimum value of that of −0.7°, and the variation cycle of the orientation angle of 10 m was prepared in the same manner as in Cellulose Ester Film 101 except that the feedback interval of set at 7 seconds and the positions of the right and left clip opener were controlled.

<Preparation of Cellulose Ester Film 109>

Cellulose Ester Film 109 having the maximum value of the orientation angle of the slow axis of the film face with the width direction of the film of +0.7° and the minimum value of that of −0.7°, the maximum value of the orientation angle of the fast angle in the surface of the film with the length direction of the film of +0.7° and the minimum value of that of −0.7°, and the variation cycle of the orientation angle of 50 m was prepared in the same manner as in Cellulose Ester Film 101 except that the feedback interval of set at 10 seconds, the lengths of the right and left of the tenter were separately varied and the interval of the blowing air amount control of set at 10 seconds.

<Preparation of Cellulose Ester Film 110>

Cellulose Ester Film 110 having the maximum value of the orientation angle of the slow axis of the film face with the width direction of the film of +0.7° and the minimum value of that of −0.7°, the maximum value of the orientation angle of the fast angle in the surface of the film with the length direction of the film of +0.7° and the minimum value of that of −0.7°, and the variation cycle of the orientation angle of 50 m was prepared in the same manner as in Cellulose Ester Film 101 except that the feedback interval of set at 10 seconds, the lengths of the right and left of the tenter were separately varied and the interval of the blowing air amount control of set at 10 seconds.

<Preparation of Cellulose Ester Film 111>

Cellulose Ester Film 111 having the maximum value of the orientation angle of the slow axis of the film face with the width direction of the film of +0.7° and the minimum value of that of −0.7°, the maximum value of the orientation angle of the fast angle in the surface of the film with the length direction of the film of +0.7° and the minimum value of that of −0.7°, and the variation cycle of the orientation angle of 70 m was prepared in the same manner as in Cellulose Ester Film 101 except that the feedback interval of set at 10 seconds, the positions of the clip opener of the right and left and that of the clip closers of the right and left sides of the tenter were separately varied and the interval of the blowing air amount control of set at 10 seconds.

<Preparation of Cycloolefin Polymer Film 201: Inventive>

A cycloolefin film stretched in the width direction was prepared by the following procedures.

<Preparation of Cycloolefin Polymer Film>

Under a nitrogen atmosphere, 500 parts of anhydride cyclohexane, 1.2 parts of 1-hexene, 0.15 parts of dibutyl ether and 30 parts if triisobutyl aluminum were charged in a reaction vessel and mixed, and then a norbornene type monomer mixture composed of 20 parts of tricycle[4.3.0.12, 5]deca-3,7-diene-dicyclopentadiene (hereinafter referred to as DCP), 140 parts of 1,4-methano-1,4,4a,9a-tetrahydrofluorene (hereinafter referred to as MTF and 40 parts of 8-methyl-tetracyclo[4.4.0.12,5.17,10]-dodeca-3-ene, hereinafter referred to as MTD, and 40 parts of tungsten hexachloride were continuously added spending 2 hours and polymerized. In the polymerized solution, 1.06 parts of butyl glycidyl ether and 0.52 parts of isopropyl alcohol were added to stop the polymerization reaction by inactivating the polymerization catalyst.

Thereafter, 270 parts of cyclohexane was added to 100 parts of the reaction solution containing thus obtained ring-opening polymer and 5 parts of a nickel-alumina catalyst, manufactured by Nikki Kagaku Co., Ltd., was added as the hydrogenation catalyst. After that, the pressure was made to 5 MPa by hydrogen and the liquid was heated by 200° C. while stirring and reacted for 4 hours. Thus a reaction liquid containing 20% of hydrogenated DCP/MTF/MTO ring-opening polymer was obtained. After removing the hydrogenation catalyst by filtration, a soft polymer Septon 2002, manufactured by Kuraray Co., Ltd., and of an antioxidant Irganox 1010, manufactured by Ciba Specialty Co., Ltd., were added dissolved, the amounts of them were both 0.1 parts for 100 parts of the polymer. Next, the cyclohexane as the solvent and the other volatile ingredient were removed from the solution by a cylindrical concentration dryer, manufactured by Hitachi Seisakusho Co., Ltd., and the hydrogenated polymer in a molten state was extruded from an extruder in a strand form and recovered as pellets after cooling. The polymerization ratio of each of the norbornene type monomers was DCP/MTF/MTD=10/70/20 which was the almost the same as the composition of the charged monomer mixture; the ratio was calculated from the composition of the norbornenes remaining in the solution after polymerization measured by gas chromatography. The hydrogenated ring-opening polymer has a weight average molecular weight (Mw) of 31,000, a molecular weight distribution (Mw/Mn) of 2.5, a hydrogenated ratio of 99.9% and a Tg of 134° C.

The pellets of thus obtained hydrogenated ring-opening polymer were dried for 2 hours at 70° C. to remove moisture in a hot air blowing dryer. After that, a cycloolefin polymer film with a thickness of 80 μm was prepared by melting and extruding the pellets by a short axis extruder having a coat hunger type T die having a width of 1,400 mm, manufactured by Mitsubishi Jukogyo Co., Ltd.; in the extruder, the diameter of the screw was 90 mm, the material of the lip of T-die was tungsten carbide and the peeling strength from the molten resin was 44 N. The Ro and Rt of the film were 45 nm and 90 nm, respectively. The melting formation was carried out in a clean room of not more than class 10,000 under conditions of a molten resin temperature of 240° C. and a T-die temperature of 240° C. Thus obtained film was stretched for 1.50 times in the width direction at a stretching temperature of 155° C. using the tenter apparatus the same as that the tenter 8 shown in FIG. 7 in the course of drying. On this occasion, the length of the tenter apparatus, the interval of the clips and the tension of the clips were controlled so that the film has the maximum value of the orientation angle of the slow axis in the film face of the film with the width direction of 0.4° and the minimum value of −0.4°, and the maximum value of the orientation angle of the fast axis in the film face of the film with the length direction of the film of 0.4, an orientation angle variation cycle of 115 m and the minimum amplitude of the cycle of 0.4°. Thus obtained film was referred to as Cycloolefin Polymer Film 201.

<Preparation of Cycloolefin Polymer Film 202: Inventive>

Figure 7:
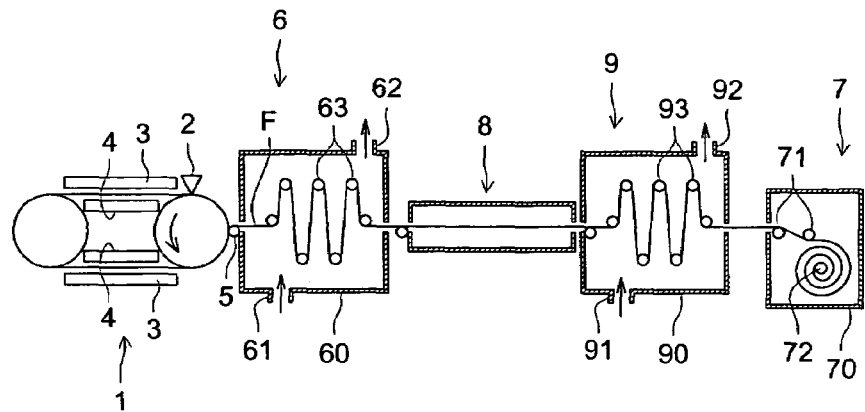
FIG. 7 shows an outline of the constitution of an example of film forming equipment for performing the invention.

Cycloolefin Polymer Film 202 having the maximum value of the orientation angle in the width direction of 45.3° and the minimum value of that of 44.7°, an amplitude of the orientation angle of the fast axis in the film face of the film with the length direction of the film of 45±0.3°, a variation cycle of the orientation angle of 140 m and the minimum amplitude of the cycle of 0.3° was prepared in the same manner as in Cycloolefin Polymer Film 201 except that the film was stretched in an angle of 45° using a tenter apparatus the same as that of the tenter 8 shown in FIG. 7 and the length of the tenter, the interval and the tension of the clips were controlled.

<Preparation of Cycloolefin Polymer Film 203: Comparative>

Cycloolefin Polymer Film 203 having the maximum value of the orientation angle in the width direction of 45.3° and the minimum value of that of 44.7°, an amplitude of the orientation angle of the fast axis in the film face of the film with the length direction of the film of 45±1.5°, a variation cycle of the orientation angle of 1.2 m and the minimum amplitude of the cycle of 1.2° was prepared in the same manner as in Cycloolefin Polymer Film 201 except that the film was stretched in an angle of 45° using a tenter apparatus the same as that of the tenter 8 shown in FIG. 7 and the length of the tenter, the interval and the tension of the clips were controlled.

Figure 6:
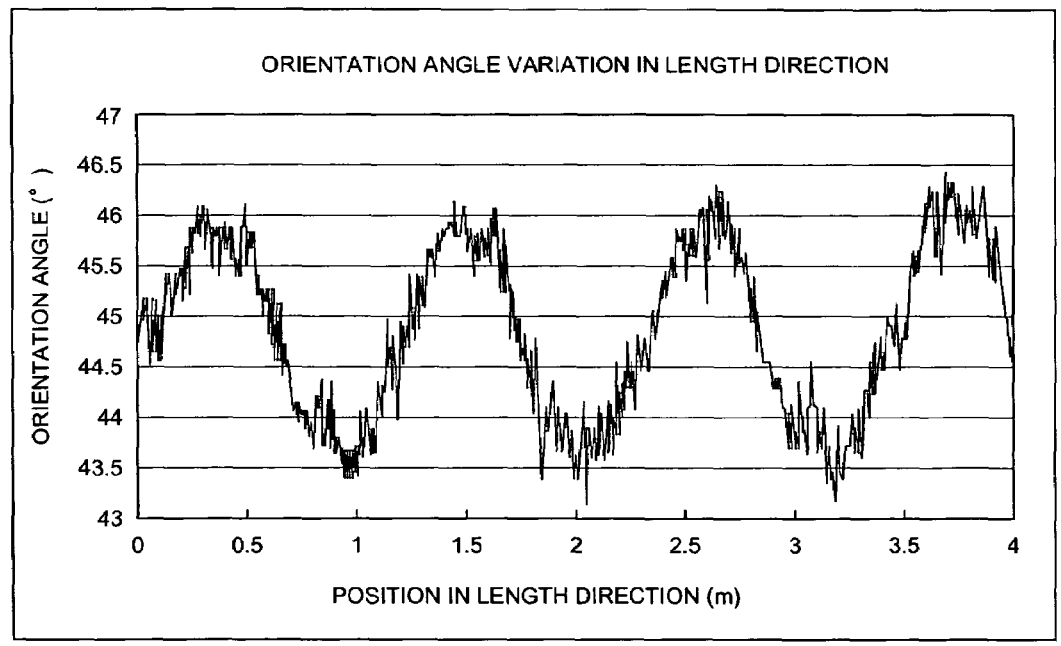
FIG. 6 shows the variation of the orientation angle in the length direction of Cycloolefin Polymer Film 203.

Thus variation of orientation angle in the length direction in Cycloolefin Polymer Film 203 is displayed in FIG. 6.

The details, Ro, Rt, the orientation angle in the width and length directions, the cycle of the orientation angle variation, the minimum amplitude of the cycle and the variation of the orientation angle in the film cut into a 60 inches wide size (1 inch is 2.54 cm) of each of Cellulose Ester Films 101 through 104 and Cycloolefin Polymer Films 201 through 203 are listed in the following Table 1.

TABLE 1

| Film No. | Kind of film | Stretching direction | Ro (nm) | Rt (nm) | Slow axis orientation angle (°) | | Fast axis orientation angle (°) | |
|---|---|---|---|---|---|---|---|---|
| | | | | | Maximum value | Minimum value | Maximum value | minimum value |
| 104 | Cellulose ester | TD | 45 | 130 | 0.4 | −0.4 | 0.4 | −0.4 |
| 102 | Cellulose ester | TD | 45 | 130 | 0.7 | −0.7 | 0.7 | −0.7 |
| 103 | Cellulose ester | Direction of 45° | 150 | 85 | 45 + 0.3 | 45 − 0.3 | 45 + 0.3 | 45 − 0.3 |
| 201 | Cycloolefin polymer | TD | 45 | 127 | 0.4 | −0.4 | 0.4 | −0.4 |
| 202 | Cycloolefin polymer | Direction of 45° | 150 | 120 | 45 + 0.3 | 45 + 0.3 | 45 + 0.3 | 45 − 0.3 |
| 104 | Cellulose ester | TD | 45 | 130 | 1.4 | −1.4 | 1.4 | −1.4 |

TABLE 1-continued

| | | | | | | | |
|---|---|---|---|---|---|---|---|
| 203 | Cycloolefin polymer | Direction of 45° | 150 | 85 | 45 + 0.3 | 45 − 0.3 | 45 + 0.3 | 45 − 0.3 |

| Film No. | Orientation angle variation cycle (m) | Minimum amplitude of variation cycle (°) | variation of orientation angle in 60 inches wide size (°) | Remarks |
|---|---|---|---|---|
| 104 | 115 | 0.3 | 0.3 | Inv. |
| 102 | 320 | 0.7 | 0.3 | Inv. |
| 103 | 140 | 0.3 | 0.3 | Inv. |
| 201 | 115 | 0.4 | 0.3 | Inv. |
| 202 | 140 | 0.3 | 0.3 | Inv. |
| 104 | 120 | 1.4 | 0.6 | Comp. |
| 203 | 1.2 | 1.2 | 0.6 | Comp. |

Inv.: Inventive
Comp.: Comparative

Polarizing plates and displaying apparatus were prepared employing the above-prepared Cellulose Ester Films 101, 102 and 104, and Cycloolefin Polymer Film 210 by the following procedures.

<<Preparation of Polarizing Plates P101, P102, P104 and P201>>

The above-prepared cellulose ester films and cycloolefin film were subjected to an alkaline saponification treatment and polarizing plates were prepared by employing them.

<Alkaline Saponofication Treatment>

| Saponification Process | 2N-NaOH | 50° C., 90 seconds |
|---|---|---|
| Washing Process | Water | 30° C., 45 seconds |
| Neutralizing Process | HCl (10 weight %) | 30° C., 45 seconds |
| Washing Process | Water | 30° C., 45 seconds |

The washing, neutralizing and washing were applied in this order after the saponification treatment, and then dried at 80° C.

<Preparation of Polarizer>

Poly(vinyl alcohol) film of 120 μm in long roll was immersed in 100 parts by weight of an aqueous solution containing 1 parts by weight of iodine and 4 parts by weight of boric acid and stretched in the conveying direction in a ratio of 6 times at 50° C. to prepare a polarizing film.

KC8UX2M manufactured by Konica-Minolta Opt Co., Ltd, saponification treated as above, referred to as TAC in the drawing, was laminated on a side of the polarizing film, and each of the cellulose ester films and the cycloolefin polymer film were laminated on the other side of the polarizing film roll to roll employing 5% aqueous solution of completely saponified poly(vinyl alcohol) as a adhesive so that the permeation axis of the polarizer and the slow axis in the film face are made parallel, and dried to prepare Polarizing Plates P101, P102, P104 and P201.

<<Preparation of Liquid Crystal Displaying Apparatus A, B, D and F>>

Figure 8:
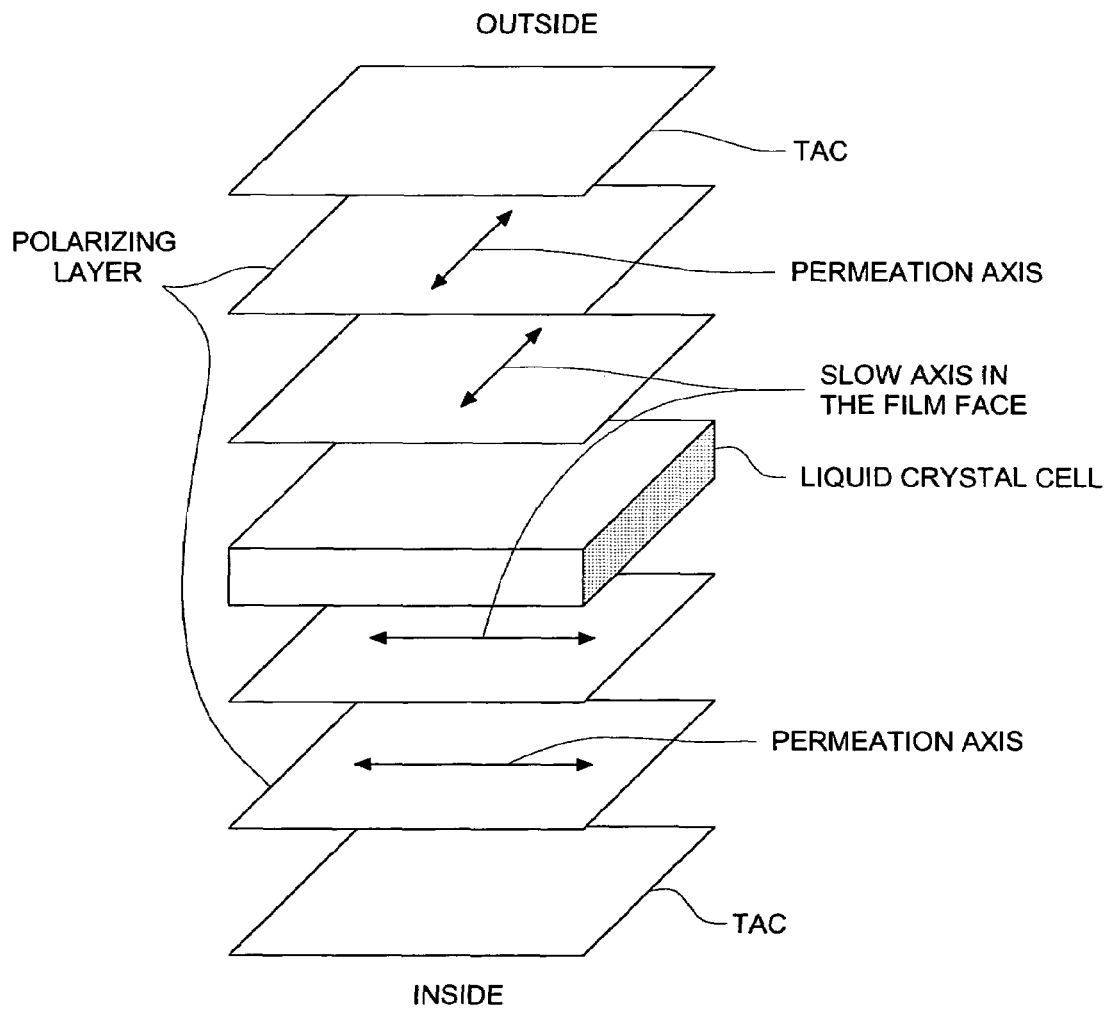
FIG. 8 shows a schematic drawing of a liquid crystal displaying apparatus.

Each of the above-obtained polarizing plate P101, P102, P104 and P210 was laminated on the both sides of a liquid crystal panel LL-T1620, manufactured by Sharp Co., Ltd., from which a polarizing plate previously laminated was peeled off, through a adhesive so to constitute the arrangement displayed in FIG. 8 in which the direction of the light permeating axis of the polarizing plate was made the same direction of the light permeating axis of the previously laminated polarizing plate to prepare liquid crystal displaying apparatus.

Next, polarizing plates and liquid crystal displaying apparatus were prepared employing the above-prepared Cellulose Ester Film 103 and Cycloolefin Polymer Films 202 and 203 in the following procedures.

<<Preparation of Polarizing Plates P103, P202 and P203>>

The bulk roll samples of the above-prepared Cellulose Ester Film 103, Cycloolefin Polymer Films 202 and 203, and TAC were subjected to the alkaline saponification treatment and preparation of the polarizing plate in the same manner as in the above-described polarizing plates to prepare Polarizing Plates P103, P202 and P203.

<<Preparation of Liquid Crystal Displaying Apparatus C, E and G>>

Figure 9:
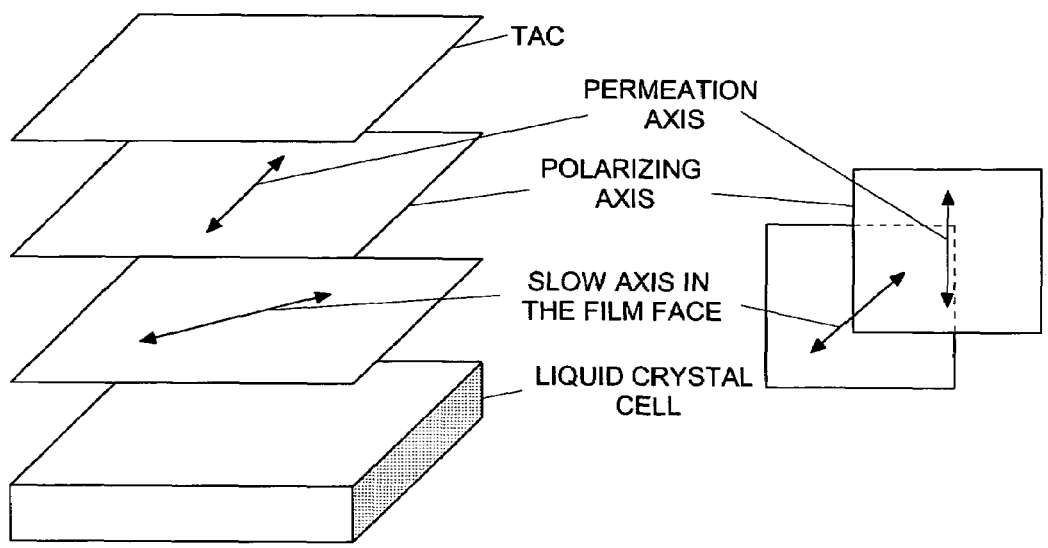
FIG. 9 shows a schematic drawing of a liquid crystal displaying apparatus.

Liquid Crystal Displaying Apparatus C, E and G were prepared by laminating each of the above-obtained Polarizing Plates P103, P202 and P203 with one side of the liquid crystal cell by the adhesive so as to meet the light permeating axis of the polarizing plate and to consisting the arrangement as shown in FIG. 9.

(Preparation of TN Type Reflection Liquid Crystal Displaying Apparatus)

A glass substrate having an ITO transparent electrode and a glass substrate having an aluminum reflection electrode having fine irregularities were prepared. On the electrode side of each of the glass substrate, a polyimide oriented layer SE-7992, manufactured by Nissan Kagaku Co., Ltd., was formed and subjected to a rubbing treatment. The two glass substrates were piled so as to face the oriented layers with together through a spacer of 3.4 μm. The directions of the substrates are controlled so that the rubbing directions were crossed with an angle of 110°. A liquid crystal MLC-2652, manufactured by Merk Co., Ltd., was poured between to form a liquid crystal layer. Thus a TN type liquid crystal cell having a twist angle of 70° and a Δnd value of 269 nm was prepared. The above-prepared polarizing plate was laminated was laminated on the glass substrate having the ITO transparency electrode. To the prepared reflective liquid crystal displaying apparatus, voltage of rectangular wave of 1 kH was applied. A voltage of 1.5 V for white image and 4.5 V for black image were each applied respectively and evaluated by human eyes. It was confirmed that both of the white and black images are not colored and neutral gray was reproduced.

<<Evaluation on Polarizing Plate and Displaying Apparatus>>

The polarizing plates and the displaying apparatus were evaluated by the following methods.

<Evaluation on Polarizing Plate>

[Yield of Polarizing]

The position of the width direction of the prepared polarizing plate was fixed and 20 samples of 16 inches size was punched in optional interval of from 0.5 m to 100 m, and the parallel transmittance and the orthogonal transmittance were measured and the polarization degree was calculated according to the following expression. Thereafter, each of the polarizing plates was subjected to an accelerated aging test for 500 hours under a condition of 60° C. and 90% RH, and then the parallel transmittance and the orthogonal transparence were again measured and the polarization degree was calculated according to the following expression. The variation of the polarizing degree was calculated by the following expression.

Polarization degree=$\{(H_0-H_{90})/(H_0+H_{90})\}^{1/2} \times 100$

Variation of polarization degree=$P_0-P_{500}$ $H_0$: Parallel transmittance $H_{90}$: Orthogonal transmittance $P_0$: Polarization degree before accelerated aging $P_{500}$: Polarization degree after accelerated aging for 500 Hours The number of the sample classified into Ranks A and B causing no problem in practical according to the following norms of the variation of the polarization degree was defined as the yield of the polarizing plate.

A: The variation ratio of the polarization degree was less than 10%; no problem for practical use.

B: The variation ratio of the polarization degree was within the range of from not less than 10% to less than 25%; no problem for practical use.

C: The variation ratio of the polarization degree was not less than 25%; a problem was caused in practical use.

[Leaked Light Amount]

Two of the polarizing plates were arranged in cross-nicol state on a glass plate of 60 inch-size and the transmittance (T1) at 590 nm was measured by a spectrophotometer U3100, manufactured by Hitachi Seisakusho Co., Ltd. The two polarizing plates were treated for 500 hours under a condition of 80° C., and then the transmittance (T2) when the polarizing plates were arranged in cross-nicol state the same as above was measured for determining the variation of the transmittance before and after the thermostatic treatment. The light leaking amount was calculated by the following expression and evaluated according to the following norms.

Leaking light amount (%) =T2 (%)–T1 (%)

Though the leaking light amount of from 0 to 5% did not cause any problem in the practical use, it was preferable to be from 0 to 4%, more preferably from 0 to 3%, and particularly preferably from 0 to 1%.

A: No leaking of light was observed at all.

B: Weak leaking of light occurred; no problem for the use.

C: Leaking of light occurred strongly; not acceptable for practical use.

<Evaluation on Liquid Crystal Apparatus>

[Unevenness in Contrast]

The transmitting light amounts of the black image and the white image were measured by EZ-contrast, manufactured by ELDIM Co., Ltd., for evaluating the viewable angle of the liquid crystal displaying apparatus. The contrast was calculated by the following expression and the evaluation on the viewable angle was carried out according to the following norms.

Contrast=(Transmitted light amount at white image)/(Transmitted light amount at black image)

The valuation of the viewable angle was carried out based on the angle showing contrast 10.

A: No unevenness in contrast was observed.

B: Weak unevenness in contrast was observed; no problem for use.

C: Strong unevenness in contrast was observed; un acceptable for practical use.

Furthermore, the liquid crystal displaying panels were subjected to an accelerated aging test under a condition of 40° C. and 80% RH, and the evaluation on the unevenness in contrast was carried out on each of the panels.

Results of the above evaluation are listed in Table 2.

TABLE 2

| Polarizing plate No. | Film No. | Yield of 16 inch-size plate (Sheets) | Light leaking of 16 inch-size plate | Liquid crystal displaying apparatus No. | Polarizing plate No. | Contrast unevenness | Contrast unevenness occurring situation after accelerated test | Remarks |
|---|---|---|---|---|---|---|---|---|
| P101 | 101 | 20/20 | A | A | P101 | A | A | Inv. |
| P102 | 102 | 18/20 | B | B | P102 | B | B | Inv. |
| P103 | 103 | 18/20 | A | C | P103 | B | B | Inv. |
| P201 | 201 | 18/20 | A | D | P201 | A | A | Inv. |
| P202 | 202 | 19/20 | A | E | P202 | B | B | Inv. |
| P104 | 104 | 5/20 | C | F | P104 | C | C | Comp. |
| P203 | 203 | 3/20 | C | G | P203 | C | C | Comp. |

Inv.: Inventive
Comp.: Comparative

The above table displays that the liquid crystal displaying apparatus excellent in the yield, the light leaking and the contrast unevenness can be provided by the film according to the invention and the polarizing plate and the liquid crystal displaying apparatus employing the film.

Comparative Example

A cellulose ester film was prepared in the same manner as in Cellulose Ester Film 101 in Example 1 except that the tension of the clips and the temperature and blowing speed in the tenter were changed synchronized with the variation cycle so that the deviation of the orientation angle of the slow axis in the film face with the width direction of the film was ±0.3°, the maximum value of the orientation angle of the fast axis in the film face of film with the length direction of the film was less than ±0.1°, the variation cycle of the orientation angle was 115 m and the minimum amplitude of the variation cycle was less than 0.1°. As a result of that, the frequency of the breaking of the film was increased by 50 times or more and a considerable difficulty was caused in the stable production of the film with a long length.

What is claimed is:

1. A roll of an optical compensation film, comprising:
   a film face,
   wherein, in an effective width of the film, an angle of a slow axis in the film face with a width direction of the film is within the range of from −1° to +1° and an angle of a fast axis in the film face with a length direction of the film is within the range of from −1° to +1°, and
   wherein the angle of the fast axis in the film face with the length direction has a cyclical variation, the cyclical variation having a cycle of from 1.5 m to 500 m in the length direction of the film and having the minimum amplitude within the range of from 0.1° to 1°.

2. The method for producing a roll of an optical compensation film of claim 1, wherein the roll of an optical compensation film is stretched in at least one direction of length and width in a stretching ratio of from 1.05 to 2.

3. The method for producing a roll of an optical compensation film of claim 1, wherein the continuous film is conveyed while the both side edges of the film are clipped and subject to tension in the width direction and stretched by a stretching apparatus, wherein the stretching is performed by independently controlling the clipping length (the distance from the starting of the clipping and the end of the clipping) of the right and left side edge of the film by the right and left clipping means of the stretching apparatus.

4. The method for producing a roll of an optical compensation film of claim 1, wherein the clipping lengths of the film on the right and left sided are independently controlled by changing at least one of the clip starting position (a clip closer arranged position) or the clip ending position (a clip opener arranged position) on the right side and the left side.

5. The method for producing a roll of an optical compensation film of claim 1, wherein the clipping lengths of the film on the right and left sided are independently controlled by independently changing the lengths of the caterpillar rails for moving connected clipping means applying tension in the width direction by clipping the right and left edges of the continuous film.

6. The method for producing a roll of an optical compensation film of claim 1, wherein the speeds of right side and left side clipping means are independently controlled in the stretching apparatus.

7. The method for producing a roll of an optical compensation film of claim 1, wherein the orientation angle of the film is measured online before the windup of the film, and at least one of the method of independently controlling the right and left clipping lengths by the right and left clipping means of the stretching apparatus and the method of independently controlling the speeds of the right and left clipping means of the stretching apparatus is applied for film producing according to the measurement result.

8. The method for producing a roll of an optical compensation film of claim 1, wherein the positions of the right and left clipping means at the clipping starting portion and the clipping ending portion are measured online to determine the retardation of the film occurring at the clipping position, and at least one of the method of independently controlling the right and left clipping lengths by the right and left clipping means of the stretching apparatus and the method of independently controlling the speeds of the right and left clipping means of the stretching apparatus is applied for film producing according to the measurement result.

9. An optical compensation film obtained by cutting the roll of the optical compensation film of claim 1.

10. The optical compensation film of claim 9, wherein the retardation (Ro) of the face expressed by the following Expression 1 is from 25 to 300 nm;

$$Ro=(nx-ny)\times d \qquad \text{Expression 1}$$

in the expression, nx is the refractive index in the direction in which the refraction index of the face becomes largest and ny is the refractive index in the direction making a right angle with the direction of nx and d is a thickness (nm) of the film.

11. The optical compensation film of claim 10, wherein the retardation (Rt) in the direction of the thickness expressed by the following Expression 2 is from −100 to 400 nm $$Rt=((nx+ny)/2-nz)\times d \qquad \text{Expression 2}$$

in the expression, nx is the refractive index in the direction in which the refraction index of the face becomes largest, ny is the refractive index in the direction making a right angle with the direction of nx, nz is the refractive index in the direction of the thickness and d is a thickness (nm) of the film.

12. A roll of a polarizing plate having the optical compensation film of claim 11.

13. The method for producing a roll of a polarizing plate produced by a roll to roll laminating method with the roll of an optical compensation film of claim 12 and with a roll of a polarizing film.

14. A polarizing plate obtained by cutting the roll of the polarizing plate of claim 12.

15. A displaying apparatus having the optical compensation film described in claim 11.

16. A roll of an optical compensation film, comprising:
    a film face,
    wherein, in an effective width of the film, an angle of a slow axis in the film face with a width direction of the film is within the range of from 44° to 46° and an angle of a fast axis in the film face with a length direction of the film is within the range of from 44° to 46°, and
    wherein the angle of the fast axis in the film face with the length direction has a cyclical variation, the cyclical variation having a cycle of from 1.5 m to 500 m in the length direction of the film and having the minimum amplitude within the range of from 0.1° to 1°.

17. The method for producing a roll of an optical compensation film of claim 16, wherein the roll of an optical compensation film is stretched in at least one direction of length and width in a stretching ratio of from 1.05 to 2.

18. The method for producing a roll of an optical compensation film of claim 16, wherein the continuous film is conveyed while the both side edges of the film are clipped and subject to tension in the width direction and stretched by a stretching apparatus, wherein the stretching is performed by independently controlling the clipping length (the distance from the starting of the clipping and the end of the clipping) of the right and left side edge of the film by the right and left clipping means of the stretching apparatus.

19. The method for producing a roll of an optical compensation film of claim 16, wherein the clipping lengths of the film on the right and left sided are independently controlled by changing at least one of the clip starting position (a clip closer arranged position) or the clip ending position (a clip opener arranged position) on the right side and the left side.

20. The method for producing a roll of an optical compensation film of claim 16, wherein the clipping lengths of the film on the right and left sided are independently controlled by independently changing the lengths of the caterpillar rails for moving connected clipping means applying tension in the width direction by clipping the right and left edges of the continuous film.

21. The method for producing a roll of an optical compensation film of claim 16, wherein the speeds of right side and left side clipping means are independently controlled in the stretching apparatus.

22. The method for producing a roll of an optical compensation film of claim 16, wherein the orientation angle of the film is measured online before the windup of the film, and at least one of the method of independently controlling the right and left clipping lengths by the right and left clipping means of the stretching apparatus and the method of independently controlling the speeds of the right and left clipping means of the stretching apparatus is applied for film producing according to the measurement result.

23. The method for producing a roll of an optical compensation film of claim 16, wherein the positions of the right and left clipping means at the clipping starting portion and the clipping ending portion are measured online to determine the retardation of the film occurring at the clipping position, and at least one of the method of independently controlling the right and left clipping lengths by the right and left clipping means of the stretching apparatus and the method of independently controlling the speeds of the right and left clipping means of the stretching apparatus is applied for film producing according to the measurement result.

24. An optical compensation film obtained by cutting the roll of the optical compensation film of claim 16.

25. The optical compensation film of claim 24, wherein the retardation (Ro) of the face expressed by the following Expression 1 is from 25 to 300 nm;

$$Ro=(nx-ny)\times d \qquad \text{Expression 1}$$

in the expression, nx is the refractive index in the direction in which the refraction index of the face becomes largest and ny is the refractive index in the direction making a right angle with the direction of nx and d is a thickness (nm) of the film.

26. The optical compensation film of claim 25, wherein the retardation (Rt) in the direction of the thickness expressed by the following Expression 2 is from −100 to 400 nm $$Rt=((nx+ny)/2-nz)\times d \qquad \text{Expression 2}$$

in the expression, nx is the refractive index in the direction in which the refraction index of the face becomes largest, ny is the refractive index in the direction making a right angle with the direction of nx, nz is the refractive index in the direction of the thickness and d is a thickness (nm) of the film.

27. A roll of a polarizing plate having the optical compensation film of claim 26.

28. The method for producing a roll of a polarizing plate produced by a roll to roll laminating method with the roll of an optical compensation film of claim 27 and with a roll of a polarizing film.

29. A polarizing plate obtained by cutting the roll of the polarizing plate of claim 27.

30. A displaying apparatus having the optical compensation film described in claims 24, 25 or 26.

* * * * *